United States Patent
Siohan et al.

(10) Patent No.: US 9,621,394 B2
(45) Date of Patent: Apr. 11, 2017

(54) METHOD FOR DETERMINING AT LEAST ONE FILTER OF A FILTER BANK OF A TRANSMISSION OR CODING SYSTEM, CORRESPONDING DEVICE AND COMPUTER PROGRAM

(71) Applicant: ORANGE, Paris (FR)

(72) Inventors: Pierre Siohan, Rennes (FR); Didier Pinchon, Toulouse (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/443,937

(22) PCT Filed: Nov. 19, 2013

(86) PCT No.: PCT/FR2013/052775
§ 371 (c)(1),
(2) Date: May 19, 2015

(87) PCT Pub. No.: WO2014/076438
PCT Pub. Date: May 22, 2014

(65) Prior Publication Data
US 2015/0304144 A1    Oct. 22, 2015

(30) Foreign Application Priority Data
Nov. 19, 2012 (FR) ...................... 12 60950

(51) Int. Cl.
*H04B 7/02* (2006.01)
*G01N 27/72* (2006.01)
(Continued)

(52) U.S. Cl.
CPC ............. *H04L 27/264* (2013.01); *H04L 5/06* (2013.01); *H04L 27/2698* (2013.01)

(58) Field of Classification Search
CPC ............... H04L 27/264; H04L 27/2649; H04L 27/2675; H04L 27/2627; H04L 27/2684; H04L 27/2692; H04L 27/36; H04L 5/06
(Continued)

(56) References Cited

U.S. PATENT DOCUMENTS 5,631,610 A * 5/1997 Sandberg ................. H03C 1/60
329/357
6,049,707 A * 4/2000 Buer ..................... H04B 1/0483
330/124 R
(Continued)

OTHER PUBLICATIONS

Maurice Bellanger: "FS-FBMC: An alternative scheme for filter bank based multicarrier transmission", Communications Control and Signal Processing (ISCCSP), 2012 5th International Symposium On, IEEE, May 2, 2012 (May 2, 2012), pp. 1-4, XP032188167, DOI: 10.1109/ISCCSP.2012.6217776, ISBN: 978-1-4673-0274-6, p. 3-p. 4.
(Continued)

*Primary Examiner* — Daniel Washburn
*Assistant Examiner* — Sarah Hassan
(74) *Attorney, Agent, or Firm* — David D. Brush; Westman, Champlin & Koehler, P.A.

(57) ABSTRACT

A method is provided for determining at least one filter of a filter bank in a transmission or coding system, on the basis of a prototype filter p. The method includes determining coefficients p[k] of the prototype filter p, of length L equal to N, from Δ angle parameters $\theta_i$, for $0 \le i \le \Delta-1$, expressed on the basis of a polynomial function $f(x)$, also referred to as a compact representation, such that:

$$f(x) = \frac{\pi}{4} + t\sum_{k=0}^{d-1} \beta_k T_{2k}(t);$$

$$t = 2x - 1.$$

19 Claims, 4 Drawing Sheets

(51) Int. Cl.
*H04L 27/26* (2006.01)
*H04L 5/06* (2006.01)

(58) Field of Classification Search
USPC .......................................... 375/267; 324/225
See application file for complete search history.

(56) References Cited

U.S. PATENT DOCUMENTS

| | | | |
|---|---|---|---|
| 6,252,909 B1* | 6/2001 | Tzannes | G10L 19/008 329/357 |
| 6,487,187 B1* | 11/2002 | Schmutz | H04B 7/2656 370/337 |
| 2002/0032570 A1* | 3/2002 | Kub | A22B 5/0017 704/500 |
| 2004/0012387 A1* | 1/2004 | Shattil | H04B 7/0857 324/225 |
| 2004/0243258 A1* | 12/2004 | Shattil | H04L 27/265 700/73 |
| 2005/0152468 A1* | 7/2005 | Lozhkin | H04L 5/06 375/260 |
| 2007/0009058 A1* | 1/2007 | Lee | H04L 1/06 375/267 |

OTHER PUBLICATIONS

Da Chen et al: "Novel prototype filter design for FBMC based cognitive radio systems through direct optimization of filter coefficients", Wireless Communications and Signal Processing (WCSP), 2010 International Conference On, IEEE, Piscataway, NJ, USA, Oct. 21, 2010 (Oct. 21, 2010), pp. 1-6, XP031799801, ISBN: 978-1-4244-7556-8, p. 3-p. 4.

Pinchon D et al: "Closed-Form Expressions of Optimal Short PR FMT Prototype Filters", Global Telecommunications Conference (GLOBECOM 2011), 2011 IEEE, IEEE, Dec. 5, 2011 (Dec. 5, 2011), pp. 1-5, XP032118793, DOI: 10.1109/GLOCOM.2011. 6133592, ISBN: 978-1-4244-9266-4, p. 1-p. 4.

International Search Report and Written Opinion dated Jan. 7, 2014 for corresponding International Application No. PCT/FR2013052775 filed Nov. 19, 2013.

English translation of the Written Opinion dated May 19, 2015 for corresponding International Application No. PCT/FR2013052775 filed Nov. 19, 2013.

Cyrille Siclet, Pierre Siohan, Didier Pinchon. Perfect Reconstruction Conditions and Design of Oversampled DFT-Modulated Transmultiplexers. Eurasip Journal on Applied Signal Processing, Hindawi Publishing Corporation, 2006, 2006, Article ID 15756, 14 p. <10.1155/ASP/2006/15756>. <hal-00114844>.

Pierre Siohan: "Analysis and Design of OFDM/OQAM Systems Based on Filterbank Theory", IEEE Transactions on Signal Processing, vol. 50, No. 5, May 2002. pp. 1170-1183.

* cited by examiner

METHOD FOR DETERMINING AT LEAST ONE FILTER OF A FILTER BANK OF A TRANSMISSION OR CODING SYSTEM, CORRESPONDING DEVICE AND COMPUTER PROGRAM

CROSS-REFERENCE TO RELATED APPLICATIONS

This Application is a Section 371 National Stage Application of International Application No. PCT/FR2013/052775, filed Nov. 19, 2013, the content of which is incorporated herein by reference in its entirety, and published as WO 2014/076438 on May 22, 2014, not in English.

1. FIELD OF THE INVENTION

The field of the invention is that of filter bank based multicarrier (FBMC) modulation.

More precisely, the invention relates to calculating the coefficients of the prototype filter for such filter banks.

Particular applications of the invention lie in the field of transmitting or coding data. In particular, the invention finds applications in transmission or coding systems that make use of so-called "advanced" multicarrier modulation such as orthogonal frequency division multiplexing/offset quadrature amplitude modulation (OFDM/OQAM), wavelet OFDM (WOFDM), or oversampled OFDM.

2. PRIOR ART

There follows a description of the prior art relating to filter bank based multicarrier modulation as used in transmission systems.

In such systems, advanced multicarrier modulation presents numerous advantages compared with conventional OFDM modulation.

For example, compared with conventional OFDM, the fact of introducing oversampling in the modulation channel makes it possible to relax the orthogonality constraint for all of the carriers of the transmission system and to perform modulation with prototype filters that are well located both in time and in frequency. Oversampled OFDM is also known as filtered multi-tone (FMT) for transmission by cable.

FIG. 1A shows an embodiment of a modem of a transmission system using modulation of the oversampled OFDM/FMT type in the form of filter banks, in which the integer expansion factor N is selected to be strictly greater than the integer number of sub-carriers M. The term "oversampled" comes from the fact that the number of samples transmitted by the modulated signal in baseband s[k] is greater than the number of samples that are strictly necessary.

Like OFDM, oversampled OFDM is an exponentially modulated system. Thus, on transmission, the modulator is made up of a synthesis filter bank (SFB) as shown in FIG. 1A, in which the impulse response of each filter $f_M$, $0 \le m \le M-1$ is obtained from a prototype filter $\underline{p}$ of length L and having real coefficients:

$$f_m[k] = p[k]e^{j\frac{2\pi mk}{M}}$$

and $$F_m(z) = \sum_{k=0}^{L-1} f_m[k]z^{-k}$$

Orthogonality conditions for the modem of FIG. 1A are established by assuming that transmission is perfect, i.e. that it does not introduce any distortion. If these orthogonality conditions are satisfied, then the complex symbols estimated on reception $\hat{c}_{m,n}$ will be identical to those on transmission $c_{m,n}$, i.e. $\hat{c}_{m,n} = c_{m,n} \forall m,n$. On reception, this requires the demodulator shown in FIG. 1A to be made up of an analysis filter bank (AFB) that is modulated as on transmission, forming a matched filter in which the impulse response of each filter $g_m$ is obtained from the time reversal of the prototype filter $\underline{p}$ used on transmission:

$$g_m[k] = p[L-1-k]e^{j\frac{2\pi m(L-1-k)}{M}}$$

The prototype filter $\underline{p}$ must also satisfy orthogonality properties so that the condition $\hat{c}_{m,n} = c_{m,n} \forall m,n$, also known as perfect reconstruction, is satisfied. For a prototype filter $$P(z) = \sum_{n=0}^{L-1} p[n]z^{-n},$$

these conditions for perfect reconstruction are written as follows:

$$\sum_v p[k+vM]p[k+vM+sN] = \delta_{s1} \ 0 \le k \le M-1, s \ge 0, \qquad (2)$$

where:
  $p[n]=0$ for $n<0$ or $n \ge L$;
  $\delta_s$ is the Kronecker symbol, such that $\delta_s=1$ if $s=0$ and $\delta_s=0$ if $s=0$; and
  k, v, and s are integer variables.

In the special case of oversampling by a factor $\Delta$ equal to $$\frac{N}{M} = 2,$$

$N = \Delta N_0$, $M = \Delta M_0$, $M_0 = 1$ and $N_0 = 2$, the condition for perfect reconstruction as given by equation (2) becomes exactly the equation for OFDM modulation systems of offset-QAM type (OFDM/OQAM) or, still in equivalent manner, the equation of cosine modulated filter bank (CMFB) systems.

From a transmission system point of view, a transmission system that uses OFDM/OQAM modulation differs from a transmission system using oversampled OFDM type modulation as shown in FIG. 1A in that the complex symbols for transmission are resolved into their real and imaginary parts, each of which is transmitted with an offset of one half of a symbol time.

By making use of the duality between systems of the transmultiplexer type as shown in FIG. 1A, where the synthesis filter bank is placed at the transmission end and the analysis filter bank at the reception end, and systems of the kind shown in FIG. 1B, where on the contrary the analysis filter bank is placed at the transmission end and the synthesis filter bank at the reception end, it is possible to obtain so-called sub-band coding systems that in real and in complex modulated form can be applied to audio coding and to image and video coding.

A large number of techniques have already been proposed for making it possible to determine the coefficients of prototype filters for modulated filter bank type systems, in particular for prototype filters having a length that is a multiple of N that is greater than 2 (where N corresponds to the expansion/decimation factor or to the number of carriers/bands depending on the type of system).

In particular, as shown in the document "*Analysis and design of OFDM/OQAM systems based on filterbank theory*" P. Siohan, C. Siclet, and N. Lacaille, IEEE Transactions on Signal Processing, vol. 50, no. 5, pp. 1170-1183, May 2002, the fact of limiting the size of the filters to time media that are very short is very penalizing for calculation methods that deduce the discrete coefficients p[n] from solutions derived from continuous time functions, by truncating them and by making them discrete.

It is therefore preferable to calculate the L discrete values of the impulse response of the prototype filter directly, where L is equal to N. As a result, if N is high, which happens in particular for systems having several thousands of carriers, this leads to an optimization problem that is very complex to solve because of the very large number of variables.

The inventors of the present patent application have proposed, in the document "*Perfect reconstruction conditions and design of oversampled DFT-modulated transmultiplexers*" by C. Siclet, P. Siohan, and D. Pinchon (EURASIP J. Appl. Sig. Proc., pp. 1-14, 2006, article ID 15756) a technique for determining the coefficients of a prototype filter for a modulated filter bank type system that consists in finding the angles that satisfy equation (2), by using the regularity properties of angles.

That technique makes it possible to determine good prototype filters, but it is very expensive in terms of calculation.

The inventors of the present patent application have also proposed, in the document "*Closed form expression of optimal short PR FMT prototype filters*", Proceedings Globecom'11 (Houston, USA), December 2011, a technique for determining the coefficients of a prototype filter for a modulated filter bank type system that makes it possible to obtain an analytical solution that satisfies at least one optimization criterion (e.g. time/frequency localization).

A drawback of the technique proposed is that it applies only to FMT systems such that $2 \leq M_0 \leq 20$. Furthermore, it enables well-localized prototype filters to be obtained only for values of $\Delta$ lying in the range 4 to 40.

Unfortunately, for transmission systems, those constraints do not make it possible to cover the situation in which the number of sub-carriers is several thousand. Specifically, considering a situation that is extreme (but also realistic) in which the oversampling ratio is 21/20, the maximum number of sub-carriers cannot exceed 800 using the technique described in that document.

Conversely, in applications of the sub-band coding type in which, for images and video, the number of subbands is generally very limited, the value of $\Delta$ (which is at least 4 in that document) is then sometimes too great.

3. SUMMARY OF THE INVENTION

The invention proposes a novel solution that does not present all of the drawbacks of the prior art, in the form of a method of determining at least one filter of a filter bench of a transmission or coding system, on the basis of a prototype filter p.

According to the invention, the method comprises a step of determining the coefficients p[k] of the prototype filter $\underline{p}$, of length L equal to N, from $\Delta$ angle parameters $\theta_i$, for $0 \leq i \leq \Delta-1$ and integer $\Delta=N/M$ ($\Delta$ being the greatest common divisor of N and M), expressed on the basis of a polynomial function $f(x)$, also referred to as a compact representation, such that:

$$f(x) = \frac{\pi}{4} + t \sum_{k=0}^{d-1} \beta_k T_{2k}(t)$$

$$t = 2x - 1$$

with:
  $T_n(t)$ the Chebyshev polynomial of degree $\underline{n}$;
  $\underline{d}$ the degree of the compact representation;
  $\beta_k$ the parameters of the compact representation;
  $\theta_i = f(x_i)$ with $$x_i = \frac{2i+1}{2\Delta};$$

$p[i] = \cos \theta_i$, $p[M+i] = \sin \theta_i$, for $0 \leq i \leq \Delta-1$;
  $p[k] = 1$, $\Delta \leq k \leq M-1$;
  M and N integers representative of the transmission or coding system.

The invention thus proposes a novel solution for determining the filters of a filter bank of a coding or transmission system, and more precisely for determining the coefficients of the prototype filter, in particular when the prototype filter is short (L=N).

To do this, consideration is given to a particular compact representation enabling the $\Delta$ angle parameters $\theta_i$ satisfying equation (2) to be expressed in polynomial form. Since a polynomial function of degree that is relatively small compared with $\Delta$ suffices to produce a good approximation for the values of the optimum angles, the compact representation makes it possible to reduce the time required for optimization when optimization is performed, not relative to the angles $\theta_i$, but relative to the coefficients of the polynomial of $f(x)$.

In particular, this representation takes account of the phase linearity of the prototype $p[n]=p[L-1-n]$ and of the symmetry relationship of the angles. The proposed compact representation of the invention is thus written solely using polynomials of even degree.

Still more precisely, in the particular situation of prototype filters that are short (L=N), each polyphase component $P_i(z)$ of the prototype filter involves only one angle, and the linear phase condition for the prototype is written as follows:

$$\theta_{M_0,\Delta,i} = \frac{\pi}{2} - \theta_{M_0,\Delta,\Delta-1-i}.$$

According to the invention, consideration is also given to an oversampling ratio that is as small as possible, which means that the invention makes it possible, in theory, to reach spectrum efficiencies that are comparable to those of CP-OFDM, but with waveforms that are well localized in time and in frequency. More precisely, consideration is given herein to oversampling factors $$\frac{N}{M}$$

such that $$\frac{N}{M} = \frac{N_0}{M_0},$$

with $N=\Delta N_0$, $M=\Delta M_0$, where $\Delta$ is a strictly positive integer, and $N_0=M_0+1$ is imposed.

The proposed solution thus makes it possible to calculate the coefficients of the prototype filter quickly, and consequently to calculate the coefficients of the filters of filter banks quickly, in particular in the event of changing one of the parameters of the transmission or coding system (such as a number of carriers or the number of subbands used, for example). The solution is thus particularly advantageous in a mobility context.

It is particularly applicable to transmission systems of the FMT type (cable), or of the oversampled OFDM type (radio), and also to other known transmission systems whether by radio (e.g. a CMFB type transceiver), or by cable (systems of the xDSL type with discrete wavelet multitone (DWMT), or indeed of the power line command (PLC) type with WOFDM).

According to a particular characteristic of the invention, the method includes a step of estimating the parameters $\beta_k$ of the compact representation, implementing at least one algorithm of the linear regression type.

This estimate makes it possible to determine a relatively simple analytical expression for each of the parameters $\beta_k$ of the compact representation.

In a first implementation of the invention, the degree $\underline{d}$ of the compact representation is equal to 2, and the estimation step delivers an estimate for the parameters $\beta_0$ and $\beta_1$ of the compact representation, such that, by writing:

$$\gamma_0(M_0, \Delta) = \frac{\pi}{4} + \beta_0(M_0, \Delta) + \beta_1(M_0, \Delta)$$

the following estimates are obtained:

$$\bar{\beta}_1(M_0, \Delta, X) = \frac{X_0}{(X_1 + M_0)^2} + \frac{X_2}{\Delta(X_3 + M_0)^2},$$

$$\bar{\gamma}_0(M_0, \Delta, X) = \left[X_4 + \frac{X_5}{(X_6 + M_0)^2} + \Delta\left(X_7 + \frac{X_8}{(X_9 + M_0)^2}\right)\right]^{-1}$$

where $X=(X_i, i=0, \ldots, 9)$ are constants and $M=\Delta M_0$.

In particular, the method includes a step of refining the constants X, implementing minimization of the following cost function J(X), for different values of $M_0$ and $\Delta$, such that $M_0 \in M_I$, where $M_I=[M_0^{min}, M_0^{max}]$, and $\Delta \in D_I$, where $D_I=[\Delta^{min}, \Delta^{max}]$:

$$J(X) = \sum_{M_0 \in M_I} \sum_{\Delta \in D_I} [\beta_1(M_0, \Delta) - \bar{\beta}_1(M_0, \Delta, X)]^2 +$$

-continued $$[\gamma_0(M_0, \Delta) - \bar{\gamma}_0(M_0, \Delta, X)]^2$$

In this first embodiment, the $\Delta$ angle parameters $\theta_i$, for $0 \leq i \leq \Delta-1$, are expressed in the following form:

$$\theta_i = f(x_i) = \frac{\pi}{2}(1 - x_i) +$$
$$(2x_i - 1)\left[\frac{1}{c(M_0) + d(M_0)\Delta} + 2[(2x_i - 1)^2 - 1]\left[a(M_0) + \frac{b(M_0)}{\Delta}\right]\right]$$

where $x_i = \frac{2i+1}{2\Delta}$ and:

$$a(M_0) = \frac{X_0}{(X_1 + M_0)^2}$$

$$b(M_0) = \frac{X_2}{(X_3 + M_0)^2}$$

$$c(M_0) = X_4 + \frac{X_5}{(M_0 + X_6)^2}$$

$$d(M_0) = X_7 + \frac{X_8}{(M_0 + X_9)^2}$$

In a second implementation, the degree $\underline{d}$ of the compact representation is equal to 3, and the estimation step delivers an estimate for the parameters $\beta_0$, $\beta_1$, and $\beta_2$ of the compact representation, such that, by writing:

$$\gamma_0(M_0, \Delta) = \frac{\pi}{4} + \beta_0(M_0, \Delta) + \beta_1(M_0, \Delta) + \beta_2(M_0, \Delta)$$

the following estimates are obtained:

$$\hat{\gamma}_0(M_0, \Delta, X) = \frac{1}{X_{M_0,0} + X_{M_0,1}\Delta}$$

$$\hat{\beta}_1(M_0, \Delta, X) = X_{M_0,2} + \frac{1}{X_{M_0,3} + X_{M_0,4}\Delta}$$

$$\hat{\beta}_2(M_0, \Delta, X) = X_{M_0,5} + \frac{1}{X_{M_0,6} + X_{M_0,7}\Delta}$$

where $X=(X_{M_0,i}, i=0, \ldots, 7)$ are constants and $M=\Delta M_0$.

In particular, the method includes a step of refining the constants X, delivering refined constants $\hat{X}=(\hat{X}_{M_0,i}, i=0, \ldots, 7)$, implementing minimization of the following cost function J(X), for different values of $\Delta$, such that $\Delta \in D_I$, where $D_I=[\Delta^{min}, \Delta^{max}]$:

$$J(X) = \sum_{\Delta \in D_I} \left\{ [\gamma_0(M_0, \Delta) - \hat{\gamma}_0(M_0, \Delta, X)]^2 + \right.$$
$$\left. [\beta_1(M_0, \Delta) - \hat{\beta}_1(M_0, \Delta, X)]^2 + [\beta_2(M_0, \Delta) - \hat{\beta}_2(M_0, \Delta, X)]^2 \right\}.$$

In this second implementation, the $\Delta$ angle parameters $\theta_i$, for $0 \leq i \leq \Delta-1$, are expressed in the following form:

$$\theta_i = f(x_i) = \frac{\pi}{2}(1 - x_i) + \frac{2x_i - 1}{\hat{X}_{M_0,0} + \hat{X}_{M_0,1}\Delta} + 8x_i(2x_i^2 - 3x_i + 1) \times \left[\hat{X}_{M_0,2} + \right.$$

$$\frac{1}{\hat{X}_{M_0,3} + \hat{X}_{M_0,4}\Delta} + 4\left(\hat{X}_{M_0,5} + \frac{1}{\hat{X}_{M_0,6} + \hat{X}_{M_0,7}\Delta}\right)(2x_i - 1)^2\right]$$

$$\text{where } x_i = \frac{2i+1}{2\Delta}.$$

In a first application example, the transmission or coding system is of the oversampled OFDM type (also known as FMT), implementing an oversampling factor $$\frac{N}{M}$$

such that N>M, with N=$\Delta N_0$, M=$\Delta M_0$, $N_0$=$M_0$+1, and in which:
for a transmission system: M represents the number of sub-carriers and N the expansion or decimation factor; or
for a coding system: M represents the expansion or decimation factor and N the number of subbands.

In a second application example, the transmission system is of the OFDM/OQAM type (also known as modified discrete Fourier transform (MDFT)) or, in dual manner, the system is of the cosine modulated filter bank type, such that N=2M, and in which:
for a transmission system: M represents the expansion or decimation factor and N the number of subbands; or
for a coding system: M represents the expansion or decimation factor and N the number of subbands.

In a third application example, the transmission system is of the WOFDM type, or in dual manner, said coding system is of the cosine modulated filter bank type, such that N=2M, and in which:
for a transmission system: M represents the expansion or decimation factor and the number of subbands; or
for a coding system: M represents the expansion or decimation factor and the number of subbands.

In another embodiment, the invention relates to a device for determining at least one filter of a filter bank in a transmission or coding system, on the basis of a prototype filter p.

According to the invention, such a device comprises a module for determining the coefficients p[k] of said prototype filter p, of length L equal to N, from $\Delta$ angle parameters $\theta_i$, for $0 \le i \le \Delta-1$ and integer $\Delta=N/M$, expressed on the basis of a polynomial function $f(x)$, also referred to as a compact representation, such that:

$$f(x) = \frac{\pi}{4} + t\sum_{k=0}^{d-1} \beta_k T_{2k}(t)$$

$$t = 2x - 1$$

using the same notation as defined above.

Such a device is particularly suitable for performing the above-described method. By way of example it may be a transmultiplexer, a transceiver, or indeed a sub-band coder. The device could naturally include the various characteristics relating to the method of the invention for determining at least one filter of a filter bank of a transmission or coding system, which may be combined or taken in isolation. Thus, the characteristics and advantages of the device are the same as those of the above-described method. Consequently, they are not described in greater detail.

In another implementation, the invention provides a computer program including instructions for performing a method of determining at least one filter of a filter bank as described above, when the program is executed by a processor.

The method of the invention may be performed in various ways, in particular in hard-wired form or in software form.

4. LIST OF FIGURES

Other characteristics and advantages of the invention appear more clearly on reading the following description of a particular implementation given merely by way of illustrative and nonlimiting example, and from the accompanying drawings, in which.

Figure 1A:
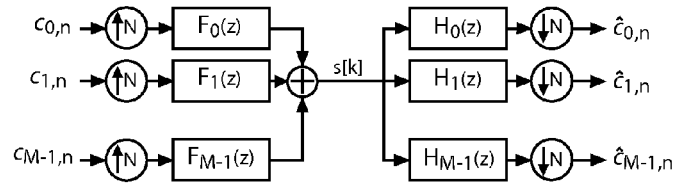
FIGS. 1A and 1B show a first example of a transmission system and of a coding system respectively of the oversampled OFDM type, in which at least one filter of the filter bank has been determined by an implementation of the invention.

5. DESCRIPTION OF AN IMPLEMENTATION OF THE INVENTION 5.1 General Principle

The general principle of the invention relies on an analytical solution for determining the coefficients of a prototype filter p, making it possible in simple, fast, and efficient manner to calculate the coefficients of such a prototype filter, and consequently to calculate the coefficients of at least one filter of a modulated filter bank.

In particular, such a prototype filter must also satisfy orthogonality constraints so that the perfect reconstruction condition is satisfied.

To do this, use is made of a particular representation of angles $\theta_i$, also referred to as a compact representation, that makes it possible to satisfy the perfect reconstruction condition by using regularity properties of angles, as described in the above-mentioned document "*Perfect reconstruction conditions and design of oversampled DFT-modulated transmultiplexers*". In particular, this compact representation of the invention takes account of the phase linearity of the prototype p[n]=p[L–1–n] and of the symmetry relationship of the angles.

Still more precisely, it is proposed in the invention to express the compact representation, not relative to the angles $\theta_i$, but relative to the coefficients of a polynomial $f(x)$, thus making it possible to reduce the time required for optimization, i.e. the time required for determining coefficients of the prototype filter that make it possible to come as close as possible to conditions of perfect reconstruction.

Thus, the coefficients p[k] of the prototype filter p, of length L equal to N, are determined from Δ angular parameters $\theta_i$, for $0 \leq i \leq \Delta-1$ and $\Delta=N/M$ expressed from the polynomial function $f(x)$ such that:

$$f(x) = \frac{\pi}{4} + t \sum_{k=0}^{d-1} \beta_k T_{2k}(t)$$

$$t = 2x - 1$$

with:
$T_n(t)$ the Chebyshev polynomial of degree n;
d the degree of the compact representation;
$\beta_k$ the parameters of the compact representation;
$\theta_i = f(x_i)$ with $$x_i = \frac{2i+1}{2\Delta};$$

p[i]=cos $\theta_i$, p[M+i]=sin $\theta_i$, for $0 \leq i \leq \Delta-1$;
p[k]=1, $\Delta \leq k \leq M-1$;
M and N integers representative of the transmission or coding system.

In the invention, attention is thus given to determining the coefficients p[n] of the prototype filter in the particular situation when its length is as short as possible but also sufficient to obtain a waveform other than the rectangular waveform used in conventional OFDM (L=N). This makes it possible in particular to reduce the operational complexity of systems.

In this particular circumstance, the polyphase components of order Δ of the prototype filter are of length that is as short as possible, i.e. $N_0$. In the invention, consideration is thus given to a prototype filter for which the z transform is expressed in the following form:

$$P(z) = \sum_{k=0}^{L-1} p[k]z^{-k} = \sum_{i=0}^{\Delta-1} z^{-i} P_i(z^\Delta)$$

with $P_i(z^\Delta)$ of length $L_0=N_0$.

Figure 1B:
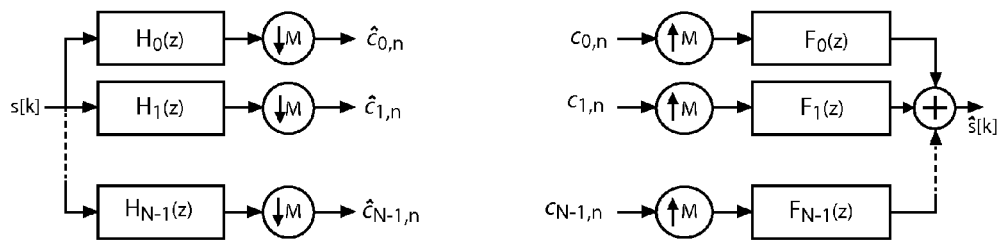

In particular, in a first application example, in which the transmission or coding system is of the oversampled OFDM type, making use of an oversampling factor $$\frac{N}{M}$$

such that N>M, with $N=\Delta N_0$, $M=\Delta M_0$, $N_0=M_0+1$, M represents the number of sub-carriers and N the expansion or decimation factor for a transmission system, and M represents the expansion or decimation factor and N the number of subbands for a coding system. Such a transmission or coding system, as described above with reference to the prior art, is shown in FIGS. 1A and 1B.

Consideration is given to the oversampled OFDM type transmultiplexer of FIG. 1A using a prototype filter p that is orthogonal and of linear phase of length L=N>2M, and as a result of the phase linearity of the prototype p[n]=p[L−1−n], the coefficients of at least one synthesis or analysis filter are expressed in the following form:

$$f_m[k] = K_1 p[k] e^{j\frac{2\pi mk}{M}}$$

with:
$K_1$ a multiplicative factor that may differ between systems in order to satisfy the perfect reconstruction condition; and
$0 \leq m \leq M-1$,
$0 \leq N \leq -1$, and
$0 \leq k \leq L-1$ In dual manner, if consideration is given to the filter bank of FIG. 1B, the coefficients of at least one synthesis or analysis filter are expressed in the following form:

$$f_n[k] = K_2 p[k] e^{j\frac{2\pi nk}{N}}$$

with:
$K_2$ a multiplicative factor that may differ between systems in order to satisfy the perfect reconstruction condition.

Figure 2A:
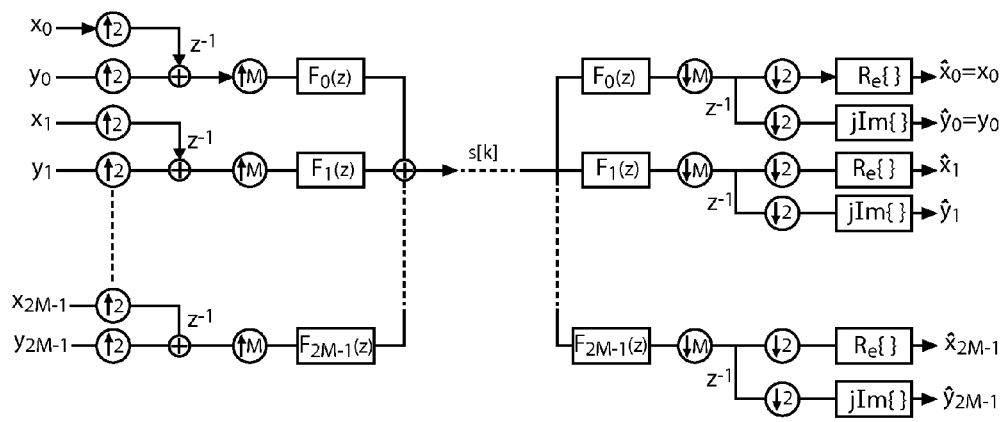
FIGS. 2A and 2B show a second example of a transmission system and of a coding system respectively of the oversampled OFDM/OQAM type, in which at least one filter of the filter bank has been determined by an implementation of the invention.
Figure 2B:
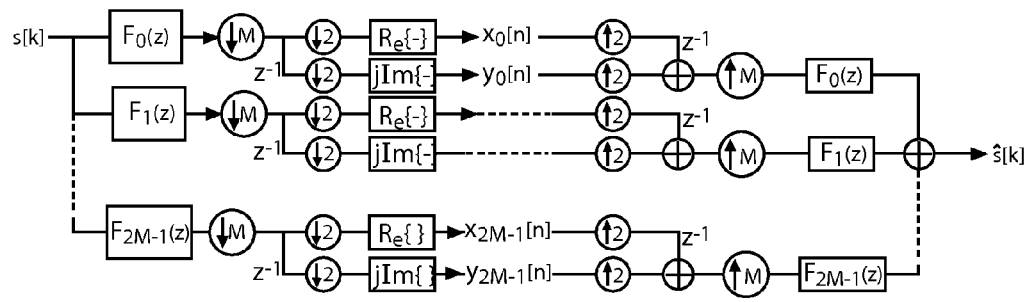

In a second application example, in which the transmission or coding system is of the MDFT type, such that N=2M, M represents the expansion or decimation factor and N the number of sub-carriers or subbands. Such a transmission or coding system is shown in FIGS. 2A and 2B.

If consideration is given to the MDFT type transmultiplexer TMUX of FIG. 2A using a prototype filter p that is orthogonal and of linear phase of length L=N=2M, and as a result of the phase linearity of the prototype p[n]=p[L−1−n], the coefficients of at least one synthesis or analysis filter are expressed in the following form:

$$f_m[k] = K_3 p[k] e^{j\frac{2\pi mk}{2M}}$$

with:
$K_3$ a multiplicative factor that may differ between systems in order to satisfy the perfect reconstruction condition; and
$0 \leq m \leq M-1$,
$0 \leq n \leq N-1$, and
$0 \leq k \leq L-1$ In dual manner, if consideration is given to the filter bank MDFT of FIG. 2B, the coefficients of at least one synthesis or analysis filter are expressed in the following form:

$$f_m[k] = K_4 p[k] e^{j\frac{2\pi mk}{2M}}$$

with:
$K_4$ a multiplicative factor that may differ between systems in order to satisfy the perfect reconstruction condition.

Figure 3A:
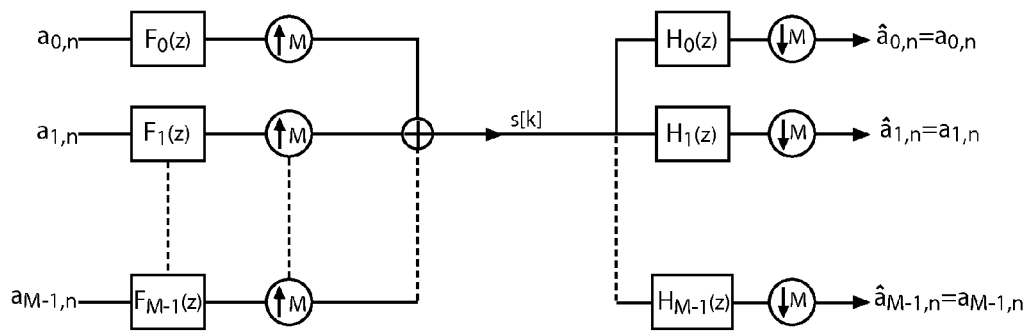
FIGS. 3A and 3B show a third example of a transmission system and of a coding system respectively of the WOFDM type, in which at least one filter of the filter bank has been determined by an implementation of the invention.
Figure 3B:
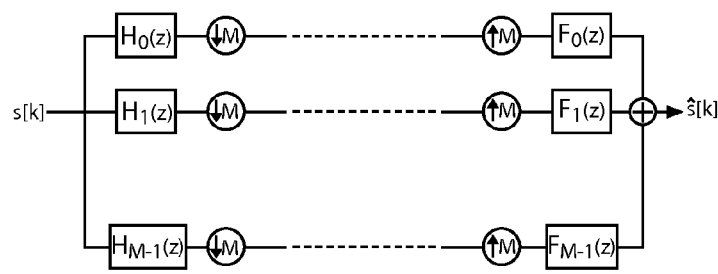

In a third application example, in which the transmission or coding system is of the WOFDM type, M represents the expansion or decimation factor and N the number of sub-carriers or subbands. Such a transmission or coding system is shown in FIGS. 3A and 3B.

If consideration is given to the WOFDM (or DWMT) transmultiplexer of FIG. 3A using a prototype filter p that is orthogonal and of linear phase of length L=N=2M, and as a result of the phase linearity of the prototype p[n]=p[L−1−n], the coefficients of at least one synthesis or analysis filter are expressed in the following form:

$$f_m[k] = K_5 p[k] \cos\left[\frac{\pi}{M}\left(m+\frac{1}{2}\right)\left(k+\frac{M+1}{2}\right)\right]$$

and the coefficients of at least one analysis filter are expressed in the same manner:

$$h_m[k] = f_m[k]$$

with:

$K_5$ a multiplicative factor that may differ between systems in order to satisfy the perfect reconstruction condition; and
$0 \leq m \leq M-1$,
$0 \leq n \leq N-1$, and
$0 \leq k \leq L-1$ In dual manner, if consideration is given to the cosine modulated filter bank of FIG. 3B, the coefficients of at least one synthesis or analysis filter are expressed in the following form:

$$h_m[k] = K_6 p[k] \cos\left[\frac{\pi}{M}\left(m+\frac{1}{2}\right)\left(k+\frac{M+1}{2}\right)\right]$$

and the coefficients of at least one synthesis filter are expressed in the same manner:

$$f_m[k] = h_m[k]$$

with:

$K_6$ a multiplicative factor that may differ between systems in order to satisfy the perfect reconstruction condition.

5.2 Determining the Parameters $\beta_k$

According to the invention, the parameters $\beta_k$ of the compact representation are estimated, in particular while taking account of the degree $\underline{d}$ of the compact representation. To do this, various values of $M_0$ and $\Delta$ are considered, such that $M_0 \in M_I$, or $M_I = [M_0^{min}, M_0^{max}]$, and $\Delta \in D_I$, where $D_I = [\Delta^{min}, \Delta^{max}]$.

5.2.1 Example of Determining the Parameters $\beta_k$ for a Degree Equal to 2

Consideration is given to a first implementation of the invention, in which the degree of the compact representation is equal to 2. Under such circumstances, it is sought to determine estimates for the two parameters $\beta_0(M_0, \Delta)$ and $\beta_1(M_0, \Delta)$ of the compact representation.

An example of an algorithm enabling these parameters to be estimated is described below.

During a first step, a change of variable is performed. The pair that is to be estimated and/or "approximated" becomes $(\gamma_0(M_0, \Delta), \beta_1(M_0, \Delta))$, with $$\gamma_0(M_0, \Delta) = \frac{\pi}{4} + \beta_0(M_0, \Delta) + \beta_1(M_0, \Delta).$$

During a second step, an approximate analytical expression is determined for $\beta_1(M_0, \Delta)$, with $M_0 \in M_I$:

step 2a: separating variables by approximating $\beta_1(M_0, \Delta)$ by $\beta_1(M_0, \Delta) \cong a(M_0) + b(M_0)/\Delta$;

step 2b: using linear regression in $1/\Delta$ to calculate digitally both $a(M_0)$ and $b(M_0)$ for each $M_0 \in M_I$, which are written a and b below:

$$\min_{a,b} \sum_{\Delta \in D_I} \left[\beta_1(M_0, \Delta) - \left(a + \frac{b}{\Delta}\right)\right]^2$$

step 2c: for $M_0 \in M_I$, searching for an analytical expression for $a(M_0)$ and $b(M_0)$ in the form $$\frac{1}{\sqrt{a(M_0)}} = A + BM_0 \text{ and } \frac{1}{\sqrt{b(M_0)}} = C + DM_0;$$

step 2d: calculating the coefficients A, B, and then C and $\underline{D}$ by linear regression on $M_0$ using the preceding expressions;

step 2e: obtaining expressions for $a(M_0)$ and $b(M_0)$ in the form:

$$a(M_0) = \frac{X_0}{(X_1 + M_0)^2}, b(M_0) = \frac{X_2}{(X_3 + M_0)^2},$$

with:

$$X_0 = \frac{1}{B^2}; X_1 = \frac{A}{B}.$$

During a third step, determining an approximate analytical expression for $\gamma_0(M_0, \Delta)$:

step 3a: separating variables by approximating $1/\gamma_0(M_0, \Delta)$ by $1/\gamma_0(M_0, \Delta) \cong c(M_0) + d(M_0)/\Delta$;

step 3b: using linear regression in $\Delta$ to calculate digitally both $c(M_0)$ and $d(M_0)$ for each $M_0 \in M_I$, which are written c and d below:

$$\min_{c,d} \sum_{\Delta \in D_I} [\gamma_0(M_0, \Delta) - (c + d\Delta)]^2$$

step 3c: for $M_0 \in M_I$, searching for an analytical expression for $c(M_0)$ and $d(M_0)$ in the form $$\frac{1}{\sqrt{c(M_0) - X_4}} = E + FM_0 \text{ and } \frac{1}{\sqrt{d(M_0) - X_7}} = G + HM_0,$$

with $X_4 = 1.273$ and $X_7 = 1.273$ selected to obtain linear behavior, by performing a dichotomic search;

step 3d: calculating the coefficients E, F and then G and H by linear regression on $M_0$ using the preceding expressions;

step 3e: obtaining expressions for $c(M_0)$ and $d(M_0)$ in the form:

$$c(M_0) = X_4 + \frac{X_5}{(M_0 + X_6)^2}, d(M_0) = X_7 + \frac{X_8}{(M_0 + X_9)^2}$$

with:

$$X_5 = \frac{1}{F^2}; X_6 = \frac{E}{F}; X_8 = \frac{1}{H^2}; X_9 = \frac{G}{H}.$$

At the end of the second and third steps, the parameters $\gamma_0(M_0,\Delta)$ and $\beta_1(M_0,\Delta)$ are thus approximated by:

$$\tilde{\beta}_1(M_0, \Delta, X) = \frac{X_0}{(X_1 + M_0)^2} + \frac{X_2}{\Delta(X_2 + M_0)^2},$$

$$\tilde{\gamma}_0(M_0, \Delta, X) = \left[X_4 + \frac{X_5}{(X_6 + M_0)^2} + \Delta\left(X_7 + \frac{X_8}{(X_9 + M_0)^2}\right)\right]^{-1},$$

where $X=(X_i, i=0, \ldots, 9)$ are constants and $M=\Delta M_0$.

By way of example, the following values are obtained for the constants $X_i$:

| i | $X_i$ |
|---|---|
| 0 | 0.1661777716145 |
| 1 | 0.1634990989807 |
| 2 | 0.3258549559822 |
| 3 | 0.2380449170014 |
| 4 | 1.273 |
| 5 | 2.0810388120457 |
| 6 | 0.2841780420036 |
| 7 | 1.273 |
| 8 | 0.5158085861520 |
| 9 | 1.0338656113891 |

During a fourth step, refined values are determined for the nine constants $X_i$, by a global optimization technique that takes as its starting point the values of the constants $X_i$ obtained at the end of the preceding steps. In other words, a search is made to minimize the following cost function $J(X)$, for different values of $M_0$ and $\Delta$:

$$J(X) = \sum_{M_0 \in M_I} \sum_{\Delta \in D_I} [\beta_1(M_0, \Delta) - \tilde{\beta}_1(M_0, \Delta, X)]^2 + [\gamma_0(M_0, \Delta) - \tilde{\gamma}_0(M_0, \Delta, X)]^2$$

Returning to the above example, after refining, the following values are obtained for the constants, written $\hat{X}_i$:

| i | $\hat{X}_i$ |
|---|---|
| 0 | 0.19403124832632 |
| 1 | 0.40864162382945 |
| 2 | 0.35329881606485 |
| 3 | 0.39920459787503 |
| 4 | 1.27060234434206 |
| 5 | 2.90492587969539 |
| 6 | 0.86264166373416 |
| 7 | 1.27240200581068 |
| 8 | 0.51760963875876 |
| 9 | 0.52820298059447 |

The $\Delta$ angle parameters $\theta_i$ enabling the perfect reconstruction condition to be satisfied, for $0 \leq i \leq \Delta-1$, can then be expressed in the following form:

$$\theta_i = f(x_i) = \frac{\pi}{2}(1 - x_i) +$$

$$(2x_i - 1)\left[\frac{1}{c(M_0) + d(M_0)\Delta} + 2[(2x_i - 1)^2 - 1]\left[a(M_0) + \frac{b(M_0)}{\Delta}\right]\right]$$

where $$x_i = \frac{2i+1}{2\Delta},$$

and it is possible to deduce therefrom the coefficients of the prototype filter $\underline{p}$, such that:
$p[i] = \cos \theta_i$, $p[M+i] = \sin \theta_i$, for $0 \leq i \leq \Delta-1$;
$p[k] = 1$, $\Delta \leq k \leq M-1$.

5.2.2 Example of Determining the Parameters $\beta_k$ for a Degree Equal to 3

Consideration is given to a second implementation of the invention, in which the degree of the compact representation is equal to 3. Under such circumstances, it is sought to determine estimates for the three parameters $\beta_0(M_0,\Delta)$, $\beta_1(M_0,\Delta)$, and $\beta_2(M_0,\Delta)$ of the compact representation.

An example of an algorithm enabling these parameters to be estimated is described below. A difference compared with the first implementation ($\underline{d}=2$) is that a solution is proposed for each individual value of $M_0$ in the range [1, 4]. It should be recalled that the special case $M_0=1$ produces a solution both for a system of the oversampled OFDM type using an oversampling factor equal to 2, and also for an OFDM/OQAM system.

During a first step, a change of variable is performed. The parameters to be estimated and/or "approximated" become $\gamma_0(M_0,\Delta), \beta_1(M_0,\Delta), \beta_2(M_0,\Delta)$ with:

$$\gamma_0(M_0, \Delta) = \frac{\pi}{4} + \beta_0(M_0, \Delta) + \beta_1(M_0, \Delta) + \beta_2(M_0, \Delta).$$

During a second step, an approximate analytical expression is determined for $\gamma_0(M_0,\Delta)$:
step 2a: separating variables by approximating $1/\gamma_0(M_0,\Delta)$ by $1/\gamma_0(M_0,\Delta) \cong X_{M_0,1} + X_{M_0,1}\Delta$;
step 2b: using linear regression in $\Delta$ for each value of $M_0$ in the range [1, 4], to calculate digitally the variables $X_{M_0,i}$, with $i=0,1$, by using intermediate variables as described in the first implementation ($\underline{d}=2$).

During a third step, an approximate analytical expression is determined for $\beta_1(M_0,\Delta)$:
step 3a: calculating linear regression coefficients in $\Delta$ for the expression $1/(X_{M_0,2} - \beta_1(M_0,\Delta))$ where the constants $X_{M_0,2}$ may be obtained by dichotomy;
step 3b: for each value of $M_0$ in the range [1, 4], by using intermediate variables as described in the first implementation ($\underline{d}=2$), obtaining regression coefficients $X_{M_0,3}$ and $X_{M_0,4}$;
step 3c: using linear regression to calculate variables $X_{M_0,i}$, with $i=0,1$, for each value of $M_0$ in the range [1, 4], by using intermediate variables as described in the first implementation ($\underline{d}=2$).

During a fourth step, determining an approximate analytical expression for $\beta_2(M_0,\Delta)$. The method is similar to that described for $\beta_1(M_0,\Delta)$ and leads to constants $X_{M_0,5}$, obtained by observations and by a dichotomic principle, and to the regression coefficients $X_{M_0,6}$ and $X_{M_0,7}$ resulting from linear regression.

At the end of the second, third, and fourth steps, the parameters $\beta_0(M_0,\Delta)$, $\beta_1(M_0,\Delta)$, and $\beta_2(M_0,\Delta)$ are thus approximated by:

$$\tilde{\gamma}_0(M_0, \Delta, X) = \frac{1}{X_{M_0,0} + X_{M_0,1}\Delta}$$

-continued $$\hat{\beta}_1(M_0, \Delta, X) = X_{M_0,2} + \frac{1}{X_{M_0,3} + X_{M_0,4}\Delta}$$

$$\hat{\beta}_2(M_0, \Delta, X) = X_{M_0,5} + \frac{1}{X_{M_0,6} + X_{M_0,7}\Delta}$$

where $X=(X_{M_0,i}, i=0, \ldots, 7)$ are constants and $M=\Delta M_0$.

By way of example, the following values are obtained for the constants $X_{M_0,i}$:

| i | $X_{1,i}$ |
|---|---|
| 0 | 3.749537060220911 |
| 1 | 1.979024470225419 |
| 2 | 0.1278 |
| 3 | 44.40837972047 |
| 4 | -23.88308992127 |
| 5 | -0.01695 |
| 6 | -59.8527100742165 |
| 7 | 0.002682543510203 |

| i | $X_{2,i}$ |
|---|---|
| 0 | 1.841075374931 |
| 1 | 1.449306149097 |
| 2 | 1.35316354744 |
| 3 | -938.4919208703 |
| 4 | -88.8361913364 |
| 5 | -0.0052 |
| 6 | 244.1654492502014 |
| 7 | 108.0508656872286 |

| i | $X_{3,i}$ |
|---|---|
| 0 | 1.52669295854 |
| 1 | 1.35316354744 |
| 2 | 0.020805 |
| 3 | 4549.332154147310 |
| 4 | -291.6673151047627 |
| 5 | -0.00246 |
| 6 | 365.1186407386227 |
| 7 | 206.4104975425009 |

During a fifth step, refined values are determined for the constants $X_{M_0,i}$, for each value of $M_0$ in the range [1, 4], by a global optimization technique that takes as its starting point the values of the constants $X_{M_0,i}$ obtained at the end of the preceding steps. In other words, a search is made to minimize the following cost function J(X), for different values of $M_0$ and $\Delta$:

$$J(X) = \sum_{\Delta \in D_I} \{[\gamma_0(M_0, \Delta) - \hat{\gamma}_0(M_0, \Delta, X)]^2 + [\beta_1(M_0, \Delta) - \hat{\beta}_1(M_0, \Delta, X)]^2 + [\beta_2(M_0, \Delta) - \hat{\beta}_2(M_0, \Delta, X)]^2\}.$$

Returning to the above example, after refining, the following values are obtained for the constants $X_{M_0,i}$, written $\hat{X}_{M_0,i}$:

| i | $\hat{X}_{1,i}$ |
|---|---|
| 0 | 4.1284847577952037 |
| 1 | 1.9727736832303955 |
| 2 | 1.2781855004225087 |
| 3 | -145.05800308934488 |
| 4 | -21.107642824529545 |
| 5 | -0.0066774831778281859 |
| 6 | -101.50558821778166 |
| 7 | 0.019143799092025265 |

| i | $\hat{X}_{2,i}$ |
|---|---|
| 0 | 1.8972250435885989 |
| 1 | 1.4476020205502769 |
| 2 | 0.042968806649312435 |
| 3 | -777.23347311710006 |
| 4 | -92.112632592071719 |
| 5 | -0.0052062788262958060 |
| 6 | 592.90534082837007 |
| 7 | 95.812941281037240 |

| i | $\hat{X}_{3,i}$ |
|---|---|
| 0 | 1.5475698371471447 |
| 1 | 1.3525325059141944 |
| 2 | 0.020804395123443165 |
| 3 | -4549.2785603914681 |
| 4 | -291.01929434623634 |
| 5 | -0.0024560808314797906 |
| 6 | 366.6582745968002 |
| 7 | 222.89866975223239 |

The $\Delta$ angle parameters $\theta_i$ enabling the perfect reconstruction condition to be satisfied, for can then be expressed in the following form:

$$\theta_i = f(x_i) = \frac{\pi}{2}(1-x_i) + \frac{2x_i-1}{\hat{X}_{M_0,0} + \hat{X}_{M_0,1}\Delta} + 8x_i(2x_i^2 - 3x_i + 1) \times$$

$$\left[\hat{X}_{M_0,2} + \frac{1}{\hat{X}_{M_0,3} + \hat{X}_{M_0,4}\Delta} + 4\left(\hat{X}_{M_0,5} + \frac{1}{\hat{X}_{M_0,6} + \hat{X}_{M_0,7}\Delta}\right)(2x_i - 1)^2\right]$$

where $$x_i = \frac{2i+1}{2\Delta},$$

and it is possible to deduce therefrom the coefficients of the prototype filter p, such that:

p[i]=cos $\theta_i$, p[M+i]=sin $\theta_i$, for $0 \le i \le \Delta-1$;
p[k]=1, $\Delta \le k \le M-1$.

Naturally, similar equations can be obtained for other values of the degree d, in particular d=1.

5.3 an Example of Determining Prototype Filters for an Oversampled OFDM System

There follows a description of a particular implementation of the invention, in which it is desired to reach accuracy of the order of $10^{-4}$ between the best localization obtained with the compact representation of the invention compared with the best localization obtained by optimizing angles, as described in the above-mentioned document "*Perfect reconstruction conditions and design of oversampled DFT-modulated transmultiplexers*", in a transmission system of oversampled OFDM type. This example reuses the equations introduced in paragraph 5.2 and gives further details.

5.3.1 Oversampling Going from 5/4 to 21/20

When $M_0$ varies from 4 to 20, with a system of oversampled OFDM type (or FMT), oversampling ratios are covered going from 5/4 to 21/20. In other words, this lies in the usual range of values for the cyclic prefix of a CP-OFDM system in which the length of the guard interval generally lies in the range 1/16 to 1/4. For the value of $\Delta$, the target is to cover the range going from 4 to 200.

In this example, consideration is given to a compact representation of degree d=2, and it is considered that $4 \le M_0 \le 20$. The values for the parameters $\beta_0$ and $\beta_1$ of the compact representation of degree 2 that give the best time/frequency localization are studied, and a simple function of $M_0$ and $\Delta$ is obtained.

The notation $\beta_0(M_0,\Delta)$ and $\beta_1(M_0,\Delta)$ is used for the parameters of the compact representation $f(x)$ giving the best time/frequency localization for a prototype filter with linear phase and perfect reconstruction for the parameters $M_0$, $N_0=M_0+1$ of length $L=\Delta N_0$, such that:

$$f(x) = \frac{\pi}{4} + t[\beta_0 + \beta_1(2t^2 - 1)],$$
$$t = 2x - 1, \text{ and}$$
$$0 \leq x \leq 1.$$

Throughout the paragraph below, the following change of variable is introduced:

$$\gamma_0(M_0, \Delta) = \frac{\pi}{4} + \beta_0(M_0, \Delta) + \beta_1(M_0, \Delta)$$

such that the polynomial function or compact representation giving the best time/frequency localization is written as follows:

$$f(x) = \frac{\pi}{2}(1-x) + t[\gamma_0(M_0, \Delta) + 2(t^2 - 1)\beta_1(M_0, \Delta)]$$

and the behavior of the parameters $\beta_1(M_0,\Delta)$ and $\gamma_0(M_0,\Delta)$ is studied as a function of $M_0$ and $\Delta$.

The inventors of the present patent application have firstly shown that, for fixed $M_0$, $\beta_1(M_0,\Delta)$ behaves approximately like a function of the form $a(M_0)+b(M_0)/\Delta$. The coefficients $a(M_0)$ and $b(M_0)$ can thus be determined by linear regression, i.e. by minimizing the function:

$$\sum_{\Delta=4}^{200} \left[\beta_1(M_0, \Delta) - \left(a(M_0) + \frac{b(M_0)}{\Delta}\right)\right]^2$$

Assuming that the functions $1/\sqrt{a(M_0)}$ and $1/\sqrt{b(M_0)}$ behave like quasi linear functions of $M_0$, the coefficients of these functions are in turn determined by linear regression, leading to an expression for $a(M_0)$ and $b(M_0)$ in the form:

$$a(M_0) = \frac{X_0}{(X_1 + M_0)^2}, \quad b(M_0) = \frac{X_2}{(X_3 + M_0)^2},$$

as already described in paragraph 5.2.1.

The inventors have then shown that, for fixed $M_0$, the inverse of $\gamma_0(M_0,\Delta)$ varies almost linearly as a function of $\Delta$. It is thus possible, by linear regression, to determine the two functions $c(M_0)$ and $d(M_0)$ such that:

$$\frac{1}{\gamma_0(M_0, \Delta)} \cong c(M_0) + \frac{d(M_0)}{\Delta}$$

Thereafter, the inventors have shown that for $X_4=1.273$, the function $(c(M_0)-X_4)^{-1/2}$ is quasi linear, and that for $X_7=1.273$, the function $(d(M_0)-X_7)^{-1/2}$ is also quasi linear.

Once more, it is thus possible to perform linear regressions in order to determine the equations of the straight lines that approximate these curves, such that it is possible to approximate the two functions $c(M_0)$ and $d(M_0)$ by the formulae:

$$c(M_0) = X_4 + \frac{X_5}{(M_0 + X_6)^2}, \quad d(M_0) = X_7 + \frac{X_8}{(M_0 + X_9)^2}$$

as already described in paragraph 5.2.1.

The parameters $\gamma_0(M_0,\Delta)$ and $\beta_1(M_0,\Delta)$ are thus approximated by:

$$\tilde{\beta}_1(M_0, \Delta, X) = \frac{X_0}{(X_1 + M_0)^2} + \frac{X_2}{\Delta(X_2 + M_0)^2},$$

$$\tilde{\gamma}_0(M_0, \Delta, X) = \left[X_4 + \frac{X_5}{(X_6 + M_0)^2} + \Delta\left(X_7 + \frac{X_8}{(X_9 + M_0)^2}\right)\right]^{-1}$$

where $X=(X_i, i=0, \ldots, 9)$ are constants and $M=\Delta M_0$.

Consideration is then given to the cost function $J(X)$ defined for $X=(X_i, i=0, \ldots, 9)$ by:

$$J(X) = \sum_{M_0=4}^{20} \sum_{\Delta=4}^{200} [\beta_1(M_0, \Delta) - \tilde{\beta}_1(M_0, \Delta, X)]^2 + [\gamma_0(M_0, \Delta) - \tilde{\gamma}_0(M_0, \Delta, X)]^2$$

and the minimum of the cost function $J(X)$ is determined by taking as the initial value for X the previously calculated sequence of constants.

The minimum of the cost function $J(X)$ can be found with a global optimization program (of the constrained feasible sequential quadratic programming (CFSQP) type, for example).

This produces the values given in paragraph 5.2.1 for the constants $X_i$ before refinement and $\tilde{x}_i$ after refinement.

These are the values that make it possible to obtain a simple expression, depending on $M_0$ and on $\Delta$, for a quasi optimum prototype filter for optimizing time/frequency localization with a relative error of less than $10^{-4}$ compared with the best prototype filter presently known for optimizing time/frequency localization.

To summarize, starting from the compact expression $f(x)$ for a degree $d=2$, and taking account of the proposed approximations for the parameters $\gamma_0(M_0,\Delta)$ and $\beta_1(M_0,\Delta)$, the $\Delta$ angle parameters $\theta_i$ are obtained, for $0 \leq i \leq \Delta-1$, by the expression:

$$\theta_i = f(x_i) = \frac{\pi}{2}(1 - x_i) + (2x_i - 1)\left[\frac{1}{c(M_0) + d(M_0)\Delta} + 2[(2x_i - 1)^2 - 1]\left[a(M_0) + \frac{b(M_0)}{\Delta}\right]\right]$$

where:

$$x_i = \frac{2i + 1}{2\Delta}.$$

So much so that, given the coefficients a($M_0$), b($M_0$), c($M_0$), and d($M_0$), these quasi optimum angles will, for any parameter $M_0$ and $\Delta$, depend only on the constants $X_i$ given in the table of paragraph 5.2.1.

5.3.2 Oversampling Going from 2 to 4/3

When $M_0$ is equal to 2 or 3, with a system of oversampled OFDM type (or FMT), oversampling ratios are covered that are equal respectively to 3/2 to 4/3. This thus lies in a particular range of values for the cyclic prefix for a CP-ODFM system corresponding to guard intervals respectively of length 1/2 and 1/3.

In contrast, when $M_0$ is equal to 1, the oversampling ratio that is covered is equal to 2. This particular situation is most advantageous, since it also makes it possible to determine the prototype filter that is presently the most used for OFDM/OQAM modulation. Furthermore, it also applies directly to solutions based on the CMFB filter bank that are competitive for transmission and that are also useful for sub-band coding.

In this example, consideration is given to a compact representation of degree d=3, and it is considered that $1 \leq M_0 \leq 3$. The values for the parameters $\beta_0$, $\beta_1$, and $\beta_2$ of the compact representation of degree 3 that give the best time/frequency localization are studied, and a simple function of $M_0$ and $\Delta$ is obtained. It is thus the best compact representation of degree 3 that is now used as a basis for finding an acceptable approximation for the values of the coefficients of the prototype filter by means of an explicit approximate formula.

Each of the situations $M_0 = (1,2,3)$ is processed in the same manner.

The notation $\beta_0(M_0,\Delta)$, $\beta_1(M_0,\Delta)$, and $\beta_2(M_0,\Delta)$ is used for the parameters of the compact representation $f(x)$ giving the best time/frequency localization for a prototype filter with linear phase and perfect reconstruction for the parameters $M_0$, $N_0 = M_0 + 1$ of length $L = \Delta N_0$, such that:

$$f(x) = \frac{\pi}{4} + t[\beta_0(M_0, \Delta) + \beta_1(M_0, \Delta) T_2(t) + \beta_2(M_0, \Delta) T_4(t)];$$

$$t = 2x - 1, \ 0 \leq x \leq 1$$

Throughout the paragraph below, the following change of variable is introduced:

$$\gamma_0(M_0, \Delta) = \frac{\pi}{4} + \beta_0(M_0, \Delta) + \beta_1(M_0, \Delta) + \beta_2(M_0, \Delta)$$

such that the polynomial function or compact representation giving the best time/frequency localization is written as follows:

$$f(x) = \frac{\pi}{2}(1-x) + \gamma_0(M_0, \Delta)t + 2t(t^2 - 1)[\beta_1(M_0, \Delta) + 4\beta_2(M_0, \Delta)t^2],$$

$$t = 2x - 1, \ 0 \leq x \leq 1,$$

and the behavior of the parameters $\beta_1(M_0,\Delta)$ and $\gamma_0(M_0,\Delta)$ is studied as a function of $M_0$ and $\Delta$.

The inventors of the present patent application have firstly shown that the inverse of the function $\gamma_0(M_0,\Delta)$ varies linearly as a function of $\Delta$ for $6 \leq \Delta \leq 200$.

A linear regression calculation thus makes it possible to obtain an approximate expression for $\gamma_0(M_0,\Delta)$ in the form:

$$\gamma_0(M_0, \Delta) \cong \frac{1}{X_{M_0,0} + X_{M_0,1}\Delta} = \bar{\gamma}_0(M_0, \Delta, X),$$

$$M_0 = 1, 2, 3, \ 4 \leq \Delta \leq 200$$

as already described in paragraph 5.2.2.

The inventors have then shown that it is possible to select constants $X_{M_0,2}$, for $M_0 = 1,2,3$ such that the variation of the function $1/(X_{M_0,2} - \beta_1(M_0,\Delta))$ is quasi linear, such that it is possible to approximate $\beta_1(M_0,\Delta)$ by $$\beta_1(M_0, \Delta) \cong X_{M_0,2} + \frac{1}{X_{M_0,3} + X_{M_0,4}\Delta} = \bar{\beta}_1(M_0, \Delta, X),$$

$$M_0 = 1, 2, 3, \ 4 \leq \Delta \leq 200$$

where the constants $X_{M_0,3}$, $X_{M_0,4}$ are obtained by linear regression.

The same procedure is used to obtain an estimate for the parameters $\beta_2(M_0,\Delta)$, that may be approximated by:

$$\beta_2(M_0, \Delta) \cong X_{M_0,5} + \frac{1}{X_{M_0,6} + X_{M_0,7}\Delta} = \bar{\beta}_2(M_0, \Delta, X),$$

$$M_0 = 1, 2, 3, \ 4 \leq \Delta \leq 200.$$

where $X = (X_{M_0,i}, i=0, \ldots, 7)$ are constants and $M = \Delta M_0$.

Consideration is then given to the cost function $J(M_0,X)$ defined for $X = (X_{M_0,i}, i=0, \ldots, 7)$ by:

$$J(X) = \sum_{\Delta=4}^{200} \left\{ [\gamma_0(M_0, \Delta) - \hat{\gamma}_0(M_0, \Delta, X)]^2 + [\beta_1(M_0, \Delta) - \hat{\beta}_1(M_0, \Delta, X)]^2 + [\beta_2(M_0, \Delta) - \hat{\beta}_2(M_0, \Delta, X)]^2 \right\},$$

and the minimum of the cost function $J(X)$ is determined by taking as the initial value for X the previously calculated sequence of constants. By way of example, a global optimization program makes it possible to determine the constants $\hat{X}_{M_0,i}$, $M_0 = 1,2,3$, $0 \leq i \leq 7$, that minimize $J(X)$.

This produces the values given in paragraph 5.2.2 for the constants $X_{M_0,i}$ before refinement and $\hat{X}_{M_0,i}$ after refinement.

As in the preceding paragraph, by writing $$x_i = \frac{2i+1}{2\Delta},$$

combining the above equations makes it possible, with the above-proposed values for the constants, to determine the $\Delta$ angle parameters $\theta_i$ that enable the perfect reconstruction condition to be satisfied, for $0 \leq i \leq \Delta - 1$, in the following form:

$$\theta_i = f(x_i) = \frac{\pi}{2}(1 - x_i) +$$

$$\frac{2x_i - 1}{\hat{X}_{M_0,0} + \hat{X}_{M_0,1}\Delta} + 8x_i(2x_i^2 - 3x_i + 1) \times \left[ \hat{X}_{M_0,2} + \frac{1}{\hat{X}_{M_0,3} + \hat{X}_{M_0,4}\Delta} + \right.$$

-continued $$4\left(\hat{X}_{M_0,5} + \frac{1}{\hat{X}_{M_0,6} + \hat{X}_{M_0,7}\Delta}\right)(2x_i - 1)^2\Bigg]$$

and it is possible to deduce therefrom the coefficients of the prototype filter p.

5.4 Analytic Study and the Performance of the Invention 5.4.1 Analysis of Phase Linearity There follow the various observations and demonstrations that have enabled the inventors to come to the proposed solution.

For fixed $M_0$, $N_0=M_0+1$, and $\Delta \geq 1$, consideration is given to the prototype filter p (or its z transform, P(z)) of length $L=\Delta N_0$ depending on the $\Delta$ angle parameters $\theta_i$, for defined by:

$$P(z) = \sum_{i=0}^{\Delta-1} z^{-i} P_i(z^\Delta)$$

where:

$$P_i(z) = \sum_{n=0}^{M_0} p_i[n] z^{-n}$$

$$p_i[0] = \cos\theta_i,$$

$$p_i[M_0] = \sin\theta_i$$

$$p_i[n] = 1, 1 \leq n \leq M_0.$$

The time/frequency localization, for the prototype filter p, is optimized by maximizing the expression $\xi(p)=1/\sqrt{4m_2 M_2}$ as defined in the above-mentioned document "*Closed form expression of optimal short PR FMT prototype filters*", as a function of $p_i$, by considering the $\Delta$ angle parameters $\theta_i$, for $0 \leq i \leq \Delta-1$, as $\Delta$ independent variables.

Figure 4:
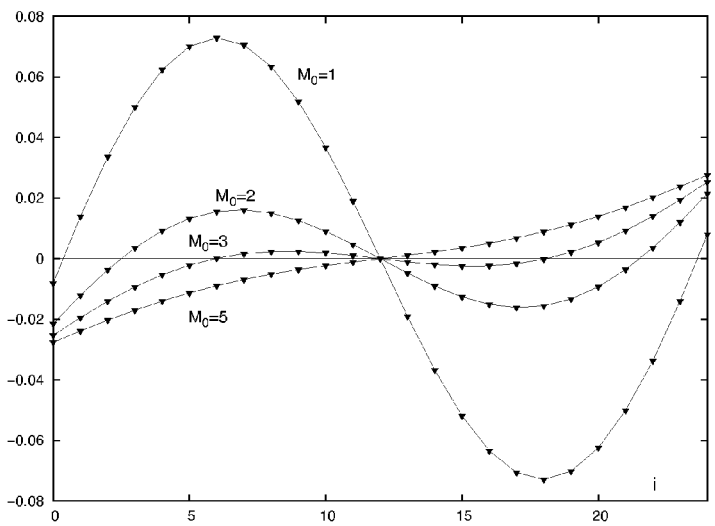
FIG. 4 shows optimum angle variations as a function of an index i.

FIG. 4 shows, for different values of $M_0=(1,2,3,5)$ and $\Delta=25$, the variations in the optimum angles as a function of i. These optimum angles may be expressed in the form $$\theta_{M_0,\Delta,i} - \frac{\pi}{2}\left(1 - \frac{2i+1}{2\Delta}\right),$$

where $\theta_{M_0,\Delta,i}$ designates the value of the $i^{th}$ optimum angle for the parameters $M_0$ and $\Delta$. It can be seen that the angles $\theta_{M_0,\Delta,i}$ vary regularly when i varies from 0 to $\Delta-1$, and that the following symmetry is approximated:

$$\theta_{M_0,\Delta,i} = \frac{\pi}{2} - \theta_{M_0,\Delta,\Delta-1-i}.$$

This symmetry, when it is satisfied exactly, implies that the optimum filter P(z) is of linear phase.

In order to comply with the observed symmetry over the optimum angles, it is proposed in the invention to use a specific polynomial function $f(x)$, also referred to as a compact representation, of the following form:

$$f(x) = \frac{\pi}{4} + t \sum_{k=0}^{d-1} \beta_k T_{2k}(t),$$

$$t = 2x - 1$$

with $T_n(t)$ the Chebyshev polynomial of degree n.

The polynomial function f proposed by the invention depends on d parameters $\beta_k$, where d is the degree of the compact representation. In particular, it complies with the symmetry property $$f(1-x) = \frac{\pi}{2} - f(x)$$

that corresponds to the symmetry property observed for the optimum angles.

5.4.2 Comparative Performance Analysis

There follows a description of the performance obtained by the technique of the invention, serving to determine the coefficients of the prototype filter when the optimizations are performed on the parameters of the compact representation $f(x)$ as defined above, in comparison with the performance obtained in the prior art, enabling coefficients of the prototype filter to be determined when the optimizations are performed directly on the angles.

By way of example, time/frequency localization is optimized with values of d going from 1 to 4 for $1 \leq M_0 \leq 20$ and $1 \leq \Delta \leq 200$. When it has been possible to obtain of the optimum localization $\xi_{opt}(M_0,\Delta)$ by direct optimization on the angles (in conventional manner), the relative error is calculated as follows:

using $\xi_{opt}^{(d)}(M_0,\Delta)$ to designate the optimum localization for the degree d of the compact representation, the following can be written:

$$\epsilon^{(d)}(M_0, \Delta) = \sigma \log_{10}\left|\frac{\xi_{opt}^{(d)}(M_0, \Delta) - \xi_{opt}(M_0, \Delta)}{\xi_{opt}(M_0, \Delta)}\right|$$

where $\sigma=-1$ if the value $\xi_{opt}^{(d)}(M_0,\Delta)$ is approximated by opt default, or else $\sigma=+1$.

Under such circumstances, the technique of the invention based on the compact representation gives better results than the conventional technique based on direct optimization of the angles.

Figure 5A:
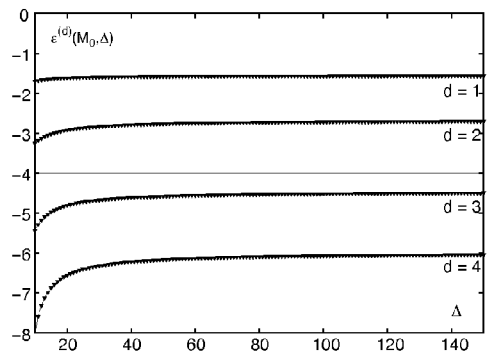
FIGS. 5A to 5D show the relative error values $\xi^{(d)}(M_0,\Delta)$ for different values of $M_0$.
Figure 5B:
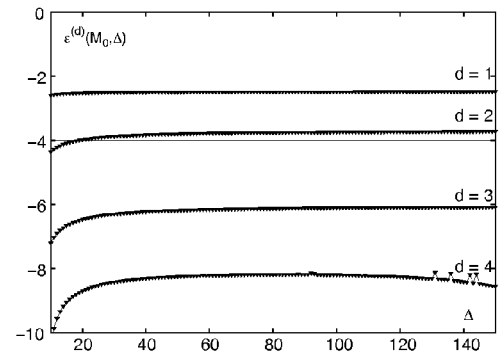
Figure 5C:
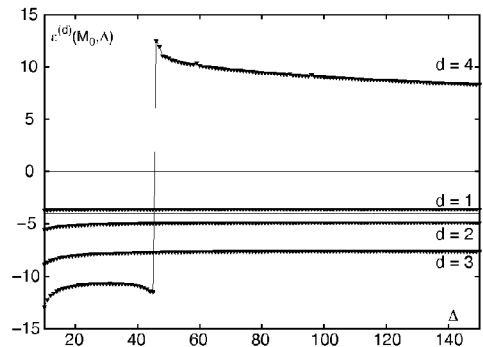
Figure 5D:
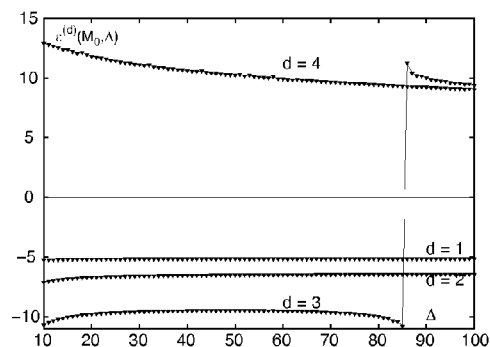

FIGS. 5A to 5D show the values of $\xi^{(d)}(M_0,\Delta)$ for different values of $M_0$ ($M_0=1$ for FIG. 5A, $M_0=2$ for FIG. 5B, $M_0=4$ for FIG. 5C, and $M_0=10$ for FIG. 5D).

FIGS. 5A and 5B show that the degree d=2 is insufficient for approximating of the best localization with relative error of less than $10^{-4}$. In FIG. 5C, it can be seen that the best localization obtained from the compact representation, for d=4, exceeds the best localization obtained by optimization of the angles, as from a certain value of $\Delta$. FIG. 5D shows that this also applies when d=3. For d=4, optimization with the compact representation gives a better result than optimization on the angles for all values of $\Delta$.

The table below gives the maximum relative error of the best localization obtained with the compact representation using $1 \leq d \leq 4$ compared with the best localization obtained by optimizing the angles ($\log_{10}\epsilon(M_0,\Delta)$). A dash indicates that for all of the values of $\Delta$ with $10 \leq \Delta \leq 200$, the result obtained with the compact representation is better than the results obtained by direct optimization with the angles:

| $M_0$ | d | | | |
|---|---|---|---|---|
| | 1 | 2 | 3 | 4 |
| 1 | −1.562 | −2.696 | −4.493 | −6.04 |
| 2 | −2.479 | −3.72 | −6.078 | −8.123 |
| 3 | −3.111 | −4.373 | −6.973 | −9.461 |
| 4 | −3.583 | −4.852 | −7.595 | −10.671 |
| 5 | −3.957 | −5.23 | −8.058 | −11.565 |
| 6 | −4.267 | −5.541 | −8.428 | — |
| 7 | −4.531 | −5.824 | −8.741 | — |
| 8 | −4.76 | −6.054 | −9.013 | — |
| 9 | −4.963 | −6.257 | −9.252 | — |
| 10 | −5.144 | −6.44 | −9.455 | — |
| 11 | −5.309 | −6.605 | −9.642 | — |
| 12 | −5.459 | −6.756 | −9.848 | — |
| 13 | −5.598 | −6.895 | −10.019 | — |
| 14 | −5.726 | −7.025 | −10.152 | — |
| 15 | −5.845 | −7.146 | −10.322 | — |
| 16 | −5.957 | −7.259 | −10.476 | — |
| 17 | −6.062 | −7.366 | −10.614 | — |
| 18 | −6.162 | −7.467 | −10.734 | — |
| 19 | −6.255 | −7.563 | −10.878 | — |
| 20 | −6.345 | −7.656 | −10.979 | — |

5.4.3 Special Circumstance of Small Values of $\Delta$

A priori, small values of $\Delta$ ($\Delta \leq 3$) relate more to sub-band coding systems than to transmission systems. Nevertheless, it should be observed that certain optical cable transmission systems nowadays present a very small number of carriers.

Prototype filters determined in accordance with the invention, and placed upstream from a multicarrier system, can also present an advantage for performing pre-coating operations.

Thus, with 3GPP LTE, the uplink uses an access system of the single carrier frequency division multiple access (SC-FDMA) type with a DFT type pre-coding operation that is applied before OFDM modulation. In the same manner, it is possible to use DFT type pre-coding before entering a modulator of OFDM/OQAM type. It is also possible to perform a pre-coding using a bank of analysis filters. Under such circumstances, if it is desired to obtain access similar to that proposed in the 3GPP uplink, which includes at least 12 carriers, it is necessary to select $\Delta \geq 6$. In contrast, if it is desired to make finer groupings, it may be necessary to have smaller values of $\Delta$, and in particular $\Delta < 4$. In either situation, in order to obtain access that is flexible in terms of the number of sub-carriers allocated to each user, as in SC-FDMA, it is essential to have a pre-coding system of AFB or SFB type that is capable of executing in real time, whence the importance of having explicit expressions for determining the coefficients of the prototype filter, such as those proposed by the invention.

A. Case of $\Delta=1$

Consideration is given to a first example in which $\Delta=1$

For $\Delta=1$, $M_0 \geq 1$, and $N_0 = M_0+1$, a prototype filter of linear phase and perfect reconstruction has the form $$P(z) = \sum_{n=0}^{M_0} p[n] z^{-n},$$

of length $L = N = \Delta N_0 = \Delta(M_0+1) = M_0+1$, with:
$p[0] = \cos \theta$;
$p[M_0] = \sin \theta$; and
$p[n] = 1$, $1 \leq n \leq M_0$.

If $M_0=1$, the prototype filter $P(z)$ is thus as of length 2 and the maximum localization is equal to 1 when both coefficients of the filter are equal, i.e. when $\theta = \pi/4$.

For $M_0 \geq 2$, the parameter $$t = \tan \frac{\theta}{2}$$

is introduced and the localization of the prototype filter defined by the value of $\theta$ may be expressed as a function of $t$.

The inventors of the present patent application have shown that the only values of $\theta \in [0, \pi/2]$ that give a prototype filter $P(z)$ of linear phase are:

$\theta=0$;

$\theta=\pi/2$, giving a prototype filter $P(z)$ having constant coefficients equal to 1 and of length $M_0$; and $\theta=\pi/4$, i.e. $t = \tan \pi/8 = \sqrt{2}-1$, giving a filter of length $M_0+1$, of maximum localization when $M_0 \leq 3$.

For $M_0 \geq 2$, the expression for the best time/frequency localization $\xi$ is given by:

$$\xi^2 = \frac{3(2+\sqrt{2})M_0^2}{2(2M_0^3 - 3(2-\sqrt{2})M_0^2 + 2(8-3\sqrt{2})M_0 - 6 + 3\sqrt{2})}.$$

It is possible to deduce an asymptotic development from this expression for the best localization when $M_0$ tends towards infinity. The algebraic constant $b = \sqrt{6+3\sqrt{2}}$ is introduced. The constant $b$ is the root of the polynomial $X^4 - 12X^2 + 18$ lying in the range 3 to 4, and it should be observed that $\sqrt{2} = \frac{1}{3}b^2 - 2$.

This produces:

$$\xi = \frac{b}{2} \frac{1}{\sqrt{M_0}} - \frac{b}{8}(b^2-12)\frac{1}{M_0^{3/2}} - \frac{b}{32}(10b^2-77)\frac{1}{M_0^{5/2}} + o\left(\frac{1}{M_0^{5/2}}\right),$$

B. Case of $\Delta=2$

Consideration is given to a second example in which $\Delta=2$.

For $\Delta=2$, $M_0 \geq 1$, and $N_0 = M_0+1$, a prototype filter of linear phase and perfect reconstruction has the form $$P(z) = \sum_{n=0}^{2M_0+1} p[n] z^{-n},$$

with:

$$p[0] = p[2M_0+1] = \cos\theta = \frac{1-t^2}{1+t^2}$$

$$p[1] = p[2M_0] = \sin\theta = \frac{2t}{1+t^2}$$

$p[n] = 1$, $2 \leq n \leq 2M_0 - 1$ $$t = \tan\frac{\theta}{2}.$$

When $M_0=1$, the square of the time/frequency localization of the prototype filter $P(z)$ is equal to:

$$\xi^2 = \frac{(1+t^2)^4}{2(t^4+2t^3-2t+1)(5t^4-4t^3-6t^2+4t+5)}.$$

This function has a maximum equal to 1 for the values $t=1$ and $$t = t_{M_0,2} = t_{1,2} = \frac{1}{3}(\sqrt{10}-1).$$

For $t=1$, the prototype filter $P(z)=z^{-1}\pm z^{-2}$ is obtained, which is only of length 2. For $t=t_{1,2}$, the inventors of the present patent application have shown that $\theta_1=2a\tan t_{1,2}$ is such that $$\cos\theta_1 = \frac{\sqrt{10}}{10},$$

$$\sin\theta_1 = \frac{3\sqrt{10}}{10},$$

such that the prototype filter $P(z)$ is proportional to the filter $1+3z^{-1}+3z^{-2}+z^{-3}$, of coefficients that are the binomial coefficients $C_3^n$, $0 \le n \le 3$.

From the above expressions, the inventors have obtained an explicit expression for the square of the localization of the prototype filter $P(z)$ for the values of $M_0>1$, as a function of $M_0 \ge 2$, and $t$:

$$\xi^2 = \frac{M_0^2(1+t^2)^4}{(3t^4+6t^2-8t+3)(c_0t^4+c_3t^3+c_2t^2+c_1t+c_0)}$$

with:

$$c_0 = \frac{1}{3}(4M_0-1)(M_0^2-2M_0+6),$$

$$c_1 = 4(2M_0^2-2M_0+1),$$

$$c_2 = \frac{2}{3}(4M_0^3-9M_0^2+2M_0-6),$$

$$c_3 = 4(1-2M_0).$$

By calculating the derivative relative to $t$ of the expression $\xi^2$, it is then possible to verify that the maximum localization of the square has a single maximum for $0<t<1$ when $t$ is the root $t_{M_0,2}$ of the polynomial $p_{M_0,2}(t)$ of degrees 8 that lies in the range 0 to 1:

$$p_{M_0,2}(t) = 9(2M_0-1)t^8 + 72M_0t^7 + 6(4M_0^3-18M_0^2+32M_0-9)t^6 -$$
$$24(5M_0-4)t^5 + 20(2M_0^3-9M_0^2-11M_0-3)t^4 +$$
$$24(12M_0^2-7M_0+2)t^3 + 2(4M_0^3-18M_0^2+152M_0+3)t^2 -$$
$$24(4M_0^2-M_0+2)t - 8M_0^3 + 35M_0^2 - 70M_0 + 21.$$

Since the polynomial $p_{M_0,2}(t)$ has rational coefficients, its root $T_{M_0,2}$ can be isolated in a range having rational endpoints that is of width that is as small as desired by using an algorithm specific to formal algebra.

By way of example, numerical values are given below for the roots $t_{M_0,2}$ over the range $1 \le M_0 \le 20$:

| $M_0$ | $t_{M_0,2}$ ($\Delta=2$) |
|---|---|
| 1 | 0.7207592200561267 |
| 2 | 0.6230611880652939 |
| 3 | 0.5998582009376935 |
| 4 | 0.5905205312373218 |
| 5 | 0.5859186862885958 |
| 6 | 0.5833429169405708 |
| 7 | 0.5817660664739736 |
| 8 | 0.5807344646811003 |
| 9 | 0.5800242478575531 |
| 10 | 0.5795151722760787 |
| 11 | 0.5791381752050025 |
| 12 | 0.5788513798845882 |
| 13 | 0.5786282325151038 |
| 14 | 0.5784512522255555 |
| 15 | 0.5783085584527088 |
| 16 | 0.5781918524974297 |
| 17 | 0.5780951979961705 |
| 18 | 0.5780142589128818 |
| 19 | 0.5779458091883689 |
| 20 | 0.5778874088955448 |

When $M_0$ tends towards infinity, $t_{M_0,2}$ can be developed in limited manner as follows:

$$t_{M_0,2} = \frac{\sqrt{3}}{3} + \frac{1}{6}(3-\sqrt{3})\frac{1}{M_0^2} + \frac{1}{24}(87-49\sqrt{3})\frac{1}{M_0^3} + o\left(\frac{1}{M_0^3}\right).$$

It can be deduced therefrom that the angle $\theta_{M_0}=2a\tan(t_{M_0,2})$ tends towards $$2a\tan\frac{\sqrt{3}}{3} = \frac{\pi}{3}$$

when $M_0$ tends towards infinity.

A limited development of the maximum localization when $M_0$ tends towards infinity is given by:

$$\xi = \frac{\sqrt{3}+1}{2}\frac{1}{\sqrt{M_0}} + \frac{9(\sqrt{3}-1)}{32}\frac{1}{M_0^{3/2}} + o\left(\frac{1}{M_0^{3/2}}\right).$$

C. Case of $\Delta=3$

Consideration is given to a third example in which $\Delta=3$. For $\Delta=3$, $M_0 \ge 1$, and $N_0=M_0+1$, a prototype filter of linear phase and perfect reconstruction has the form $$P(z) = \sum_{n=0}^{3M_0+2} p[n]z^{-n},$$

with:

$$p[0] = p[3M_0+2] = \cos\theta = \frac{1-t^2}{1+t^2}$$

$$p[1] = p[3M_0+1] = \frac{\sqrt{2}}{2}$$

$$p[2] = p[3M_0] = \sin\theta = \frac{2t}{1+t^2}$$

$$p[n] = 1, \ 3 \le n \le 3M_0-1$$

$$t = \tan\frac{\theta}{2}.$$

When $M_0=1$, the maximum time/frequency localization of the prototype filter P(z) is obtained when t is the only positive root $t_{1,3}$ of the polynomial $p_{1,3}(t)$ of degree 8:

$$p_{1,3}(t)=85t^8+2(559+533\sqrt{2})t^7-2(455+114\sqrt{2})t^6-2(779+655\sqrt{2})t^5+100(4+5\sqrt{2})t^4+2(29+355\sqrt{2})t^3+2(615+314\sqrt{2})t^2-26(13+29\sqrt{2})t-5(33+20\sqrt{2}),$$

that is equal to 0.7735089904848272.

When $M_0>1$, the maximum time/frequency localization of the prototype filter P(z) is obtained for $t=t_{M_0,3}$ where $t_{M_0,3}$ is the root lying in the range 0 to 1 of the polynomial $p_{M_0,3}(t)$ of degree 6:

$$p_{M_0,3}(t) = (2+\sqrt{2})[-9M_0^3+9(4+\sqrt{2})M_0^2-2(49+6\sqrt{2}M_0+36-7\sqrt{2})]$$
$$t^6-[18M_0^3+78M_0^2+4(48+19\sqrt{2})M_0+8(9+2\sqrt{2})]$$
$$t^5-[9(2+2\sqrt{2})M_0^3+18(1+3\sqrt{2})M_0^2-2(202+143\sqrt{2})M_0-2(23-19\sqrt{2})]t^4-$$
$$4\sqrt{2}[9M_0^3-36M_0^2-58M_0-12]t^3+[9(2+\sqrt{2})M_0^3-18(9+7\sqrt{2})M_0^2-2(202+83\sqrt{2})M_0-2(33+31\sqrt{2})]t^2-[18\sqrt{2}M_0^3-72(1+2\sqrt{2})M_0^2-4(48-67\sqrt{2})M_0-8(9+8\sqrt{2})]t+$$
$$9(2+\sqrt{2})M_0^3-18(3+\sqrt{2}M_0^2+2(86+25\sqrt{2})M_0-2(1+27\sqrt{2}).$$

The polynomial $p_{M_0,3}(t)$ was obtained by differentiating the explicit expression for the localization of the prototype filter P(z) relative to the variable t.

The polynomial $p_{M_0,3}(t)$, for $M_0 \geq 1$, does not have a rational coefficient, such that it is not possible to find an interval with rational endpoints and of arbitrarily small width that contains the root lying in the range 0 to 1 by using the root isolation algorithms of formal algebra. Nevertheless, the numerical value of the root can be calculated with arbitrarily great precision.

By way of example, numerical values are given below for the roots $t_{M_0,3}$ over the range $1 \leq M_0 \leq 20$:

| $M_0$ | $t_{M_0, 3}$ ($\Delta = 3$) |
|---|---|
| 1 | 0.7735089904848272 |
| 2 | 0.7078423264003086 |
| 3 | 0.6879934489472395 |
| 4 | 0.6798534100842811 |
| 5 | 0.6758129170006672 |
| 6 | 0.6735394554693185 |
| 7 | 0.6721416282856840 |
| 8 | 0.6712238084245449 |
| 9 | 0.6705899762112198 |
| 10 | 0.6701344596441964 |
| 11 | 0.6697963667960210 |
| 12 | 0.6695386673479854 |
| 13 | 0.6693378192797244 |
| 14 | 0.6691782882675755 |
| 15 | 0.6690494946226222 |
| 16 | 0.6689440344482865 |
| 17 | 0.6688566025042910 |
| 18 | 0.6687833178070148 |
| 19 | 0.6687212888471892 |
| 20 | 0.6686683259532107 |

The polynomial $p_{M_0,3}(t)$ is of degree 3 in the variable $M_0$. Thus, when $M_0$ tends towards infinity, $t_{M_0,3}$ tends towards the value of t lying in the range 0 to 1 that zeroes the coefficient $c_3$ of the degree 3 term for $M_0$ in the expression for the polynomial $p_{M_0,3}(t)$:

$$c_3=-9(2+\sqrt{2})(1+t^2)^2(t^2+2t(\sqrt{2}-1)-1).$$

The positive root of the coefficient $c_3$ is equal to:

$$t_{\infty,3} = \sqrt{4-2\sqrt{2}} - \sqrt{2} + 1 = \tan\frac{3\pi}{16} \approx 0.668178638.$$

From this result, it is possible to determine an asymptotic development of $t_{M_0,3}$ when $M_0$ tends towards infinity. The algebraic constant $b=\sqrt{4+2\sqrt{2}}$ is introduced, which is the root of the fourth degree equation $X^4-8X^2+8=0$. The quotient of the polynomial in b can be written as a third-degree polynomial in b having a rational coefficients, and the following calculations are performed in the algebraic extension of rationals by b, which is an algebraic extension of degree 4 of the rationals (Q(b)=Q[b]).

It should be observed that $\sqrt{2}=2-\frac{1}{2}b^2$, and that $t_\infty=\frac{1}{2}b^2+b-1$, and that the following limited development is obtained:

$$t_{M_0,3} = t_{\infty,3} + \left(\frac{20}{3} + 4b - \frac{19}{3}b^2 - \frac{8}{3}b^3\right)\frac{1}{M_0^2} + \left(8 + \frac{44}{3}b - \frac{116}{9}b^2 - \frac{62}{9}b^2\right)\frac{1}{M_0^3} + o\left(\frac{1}{M_0^3}\right).$$

By feeding this result into the explicit expression for localization as a function of $M_0$ and of t, a limited development is obtained for the value of the maximum localization when $M_0$ tends towards infinity:

$$\xi^2 = \left(1 + \frac{7}{8}b - \frac{1}{8}b^2 - \frac{1}{8}b^3\right)\frac{1}{M_0} + \frac{1}{4M_0^2} + o\left(\frac{1}{M_0^2}\right)$$

and, by introducing the variable c:

$$c=(1+\tfrac{7}{8}b-\tfrac{1}{8}b^2-\tfrac{1}{8}b^3)^{1/2}$$

the following is obtained:

$$\xi = c\left[\frac{1}{M_0^{1/2}} + \left(1-b+\frac{1}{8}b^3\right)\frac{1}{M_0^{3/2}} + o\left(\frac{1}{M_0^{3/2}}\right)\right].$$

D. Other Situations

For the values $\Delta=4$ or $\Delta=5$, prototype filters of linear phase and perfect reconstruction that are short in length ($N_0=M_0+1$, $L=N=\Delta N_0$) depend on two angle parameters.

Inventors have shown that there exists only one value for this pair of angles that makes it possible to obtain maximum time/frequency localization.

5.4.4 Assessment

In its second column, the table below gives the maximum of the (base 10) logarithm for the relative error obtained with the quasi optimum prototype filters obtained in accordance with the invention when $1 \leq \Delta \leq 200$. The following columns show that the same method can be used for greater values of $\Delta$.

| | Δ | | | |
|---|---|---|---|---|
| $M_0$ | [1-200] | 512 | 1024 | 2048 |
| 1 | −4.49599 | −4.39377 | −4.02393 | −3.24624 |
| 2 | −4.98063 | −6.04721 | −6.0407 | −6.03758 |
| 3 | −5.71222 | −6.92517 | −6.9177 | −6.91479 |
| 4 | −4.13465 | −4.13618 | −4.1361 | −4.13606 |
| 5 | −4.52595 | −4.52562 | −4.52552 | −4.52548 |
| 6 | −4.84744 | −4.84707 | −4.84696 | −4.84691 |
| 7 | −5.1205 | −5.12011 | −5.12 | −5.11996 |
| 8 | −5.35747 | −5.3571 | −5.357 | −5.35697 |
| 9 | −5.56659 | −5.56628 | −5.5662 | −5.5662 |
| 10 | −5.7536 | −5.75338 | −5.75333 | −5.75337 |
| 11 | −5.92264 | −5.92255 | −5.92255 | −5.92264 |
| 12 | −6.07616 | −6.07689 | −6.07695 | −6.0771 |
| 13 | −6.1979 | −6.21875 | −6.21888 | −6.21912 |
| 14 | −6.30589 | −6.34997 | −6.3502 | −6.35054 |
| 15 | −6.40197 | −6.47202 | −6.47235 | −6.4728 |
| 16 | −6.48767 | −6.58608 | −6.58653 | −6.58709 |
| 17 | −6.56427 | −6.69311 | −6.69371 | −6.6944 |
| 18 | −6.63288 | −6.79392 | −6.79469 | −6.79553 |
| 19 | −6.69444 | −6.88917 | −6.89013 | −6.89115 |
| 20 | −6.74978 | −6.97945 | −6.98062 | −6.98184 |

The proposed solution thus provides a technique for explicit calculation of the coefficients of prototype filters of modulated systems, which solution presents numerous advantages (speed of calculation, suitability for being incorporated in systems that operate in real time, etc.).

In particular, in most circumstances, the prototype filters that are obtained present better time/frequency localization than the prototype filters that are obtained by performing an angle optimization technique as proposed in the prior art.

Furthermore, the proposed solution is immediately applicable to oversampled systems using an oversampling factor equal to 2, and thus makes it possible, in equivalent manner, to determine the coefficients of prototype filters used for OFDM/OQAM modulation.

It should be observed that the proposed solution is defined for short prototype filters, of length L=N (where N defines a number of sub-carriers, the expansion or decimation factor, or the number of subbands, depending on the system under consideration). Short filters present the advantage of being less complex than longer filters, and they are of performance that is good enough for certain types of transmission channel. In particular, it has been shown that the shortest prototype filters are better at withstanding frequency drift, e.g. of the kind associated with the Doppler effect. This is particularly true if the prototype filter is optimized as a function of the criterion for maximizing time/frequency localization, which has the effect of concentrating the energy of the impulse response in a small number of coefficients.

Furthermore, prototype filters that are long are used more frequently in transmission systems, in order to enable the various transmission channels to be separated more easily. The proposed solution, which lies in the particular context of prototype filters that are short, is thus not obvious for the person skilled in the art.

The proposed solution also applies in pre-coded modulation systems, in particular systems that use a small number of subbands.

In application of a conventional duality rule, all of the results described can be applied equally well to sub-band coding systems.

Finally, in the context of practical embodiments of sub-band coding or multicarrier transmission systems, an advantage of having explicit formulae available is to enable reconfigurable systems to be implemented in real time. That can be more particularly advantageous in the general context of systems of the intelligent radio type, or at present, in the more specific context of using unoccupied carriers ("white spaces") for Wi-Fi type systems.

Figure 6:
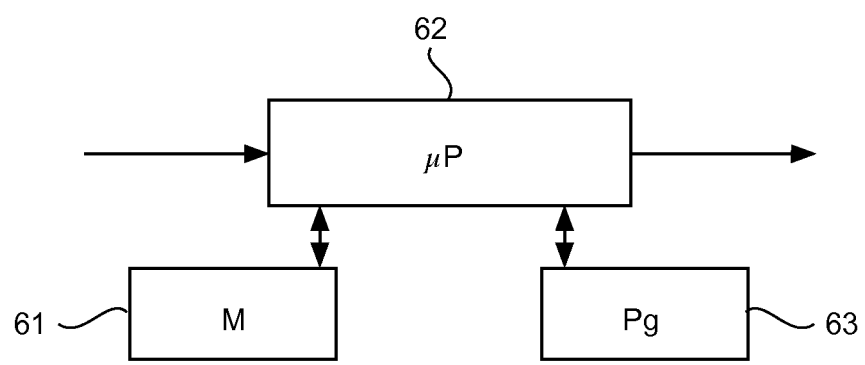
FIG. 6 shows the structure of a device implementing a technique for determining the coefficients of at least one filter of a filter bank in a particular implementation of the invention.

5.5 Structure of a Device for Determining at Least One Filter of a Filter Bank in a Transmission or Coding System, on the Basis of a Prototype Filter p Finally, with reference to FIG. 6, there follows a description of the simplified structure of a device using a technique for determining at least one filter of a filter bank in a transmission or coding system on the basis of a prototype filter p, in application of a particular implementation as described above.

Such a device comprises a memory 61 including a buffer memory, a processor unit 62, e.g. having a microprocessor μP, and controlled by a computer program 63 for performing the method of determining at least one filter of a filter bank in a transmission or coding system on the basis of a prototype filter p in a particular implementation of the invention.

On initialization, the code instructions of the computer program 63 may for example be loaded into a random access memory (RAM) prior to being executed by the processor of the processor unit 62. The processor unit 62 receives as input the values for the parameters d, N, and M. The microprocessor of the processor unit 62 performs the steps of the above-described method in application of the instructions of the computer program 63 in order to determine the coefficients of the prototype filter p, and then the coefficients of at least one filter of the analysis or synthesis bank. To do this, in addition to the buffer memory 61, the device comprises a module for determining the coefficients p[k] of the prototype filter p of length L equal to N using Δ angle parameters $θ_i$ expressed on the basis of a polynomial function $f(x)$, also known as a compact representation, such as $$f(x) = \frac{\pi}{4} + t\sum_{k=0}^{d-1} \beta_k T_{2k}(t),$$

t=2x−1. These means are controlled by the microprocessor of the processor unit 62.

The invention claimed is:

1. A method of modulating symbols for transmission in a transmission system, said method comprising:
   performing the following acts with a processing device:
      determining coefficients p[k] of a prototype filter p for the transmission system, of length L equal to N, from Δ angle parameters $θ_i$, for $0 ≤ i ≤ Δ−1$ and integer Δ=N/M, expressed on the basis of a polynomial function $f(x)$, also referred to as a compact representation, such that:

$$f(x) = \frac{\pi}{4} + t\sum_{k=0}^{d-1} \beta_k T_{2k}(t)$$

$$t = 2x - 1$$

with:
   $T_n(t)$ the Chebyshev polynomial of degree n;
   d the degree of the compact representation;
   $β_k$ the parameters of the compact representation;
   $θ_i = f(x_i)$ with $$x_i = \frac{2i+1}{2\Delta};$$

p[i]=cos $\theta_i$, p[M+i]=sin $\theta_i$, for $0 \leq i \leq \Delta-1$;
p[k]=1, $\Delta \leq k \leq M-1$;
wherein M and N are integers representative of said transmission system, and
determining filter coefficients of at least one filter of a filter bank for the transmission system using the determined coefficients p[k];
implementing the at least one filter of the filter bank using the filter coefficients in the transmission system; and
modulating symbols for transmission using the at least one filter of the filter bank, which is configured with the filter coefficients.

2. A method according to claim 1, including estimating the parameters $\beta_k$ of the compact representation, implementing at least one algorithm of the linear regression type.

3. A method according to claim 2, wherein, when said degrees $\underline{d}$ of the compact representation is equal to 2, said estimating delivers an estimate for the parameters $\beta_0$ and $\beta_1$ of the compact representation, such that, by writing:

$$\gamma_0(M_0, \Delta) = \frac{\pi}{4} + \beta_0(M_0, \Delta) + \beta_1(M_0, \Delta)$$

the following estimates are obtained:

$$\tilde{B}_1(M_0, \Delta, X) = \frac{X_0}{(X_1 + M_0)^2} + \frac{X_2}{\Delta(X_2 + M_0)^2},$$

$$\overline{\gamma}_0(M_0, \Delta, X) = \left[X_4 + \frac{X_5}{(X_6 + M_0)^2} + \Delta\left(X_7 + \frac{X_8}{(X_9 + M_0)^2}\right)\right]^{-1}$$

where $X=(X_i, i=0, \ldots, 9)$ are constants and $M=\Delta M_0$.

4. A method according to claim 3, including refining the constants X, implementing minimization of the following cost function J(X), for different values of $M_0$ and $\Delta$, such that $M_0 \in M_I$, where $M_I=[(M_0^{min}, M_0^{max}]$, and $\Delta \in D_I$, where $D_I=[\Delta^{min}, \Delta^{max}]$:

$$J(X) = \sum_{M_0 \in M_I} \sum_{\Delta \in D_I} \left[\beta_1(M_0, \Delta) - \tilde{\beta}_1(M_0, \Delta, X)\right]^2 +$$

$$[\gamma_0(M_0, \Delta) - \overline{\gamma}_0(M_0, \Delta, X)]^2.$$

5. A method according to claim 3, wherein said $\Delta$ angle parameters $\theta_i$, for $0 \leq i \leq \Delta-1$, are expressed in the following form:

$$\theta_i = f(x_i) = \frac{\pi}{2}(1 - x_i) +$$

$$(2x_i - 1)\left[\frac{1}{c(M_0) + d(M_0)\Delta} + 2[(2x_i - 1)^2 - 1]\left[a(M_0) + \frac{b(M_0)}{\Delta}\right]\right]$$

where $x_i = \frac{2i+1}{2\Delta}$ and:

$$a(M_0) = \frac{X_0}{(X_1 + M_0)^2}$$

$$b(M_0) = \frac{X_2}{(X_3 + M_0)^2};$$

$$c(M_0) = X_4 + \frac{X_5}{(M_0 + X_6)^2};$$

$$d(M_0) = X_7 + \frac{X_8}{(M_0 + X_9)^2}.$$

6. A method according to claim 2, wherein, when said degrees $\underline{d}$ of the compact representation is equal to 3, said estimating delivers an estimate for the parameters $\beta_0$, $\beta_1$, and $\beta_2$ of the compact representation, such that, by writing:

$$\gamma_0(M_0, \Delta) = \frac{\pi}{4} + \beta_0(M_0, \Delta) + \beta_1(M_0, \Delta) + \beta_2(M_0, \Delta)$$

the following estimates are obtained:

$$\hat{\gamma}_0(M_0, \Delta, X) = \frac{1}{X_{M_0,0} + X_{M_0,1}\Delta}$$

$$\hat{\beta}_1(M_0, \Delta, X) = X_{M_0,2} + \frac{1}{X_{M_0,3} + X_{M_0,4}\Delta}$$

$$\hat{\beta}_2(M_0, \Delta, X) = X_{M_0,5} + \frac{1}{X_{M_0,6} + X_{M_0,7}\Delta}$$

where $X=(X_{M_0,i}, i=0, \ldots, 7)$ are constants and $M=\Delta M_0$.

7. A method according to claim 6, including refining the constants X, delivering refined constants $\hat{X}=(\hat{X}_{M_0,i}, i=0, \ldots, 7)$, implementing minimization of the following cost function J(X), for different values of $\Delta$, such that $\Delta \in D_I$, where $D_I=[\Delta^{min}, \Delta^{max}]$:

$$J(X) = \sum_{\Delta \in D_I} \left\{[\gamma_0(M_0, \Delta) - \hat{\gamma}_0(M_0, \Delta, X)]^2 + \right.$$

$$\left.\left[\beta_1(M_0, \Delta) - \hat{\beta}_1(M_0, \Delta, X)\right]^2 + \left[\beta_2(M_0, \Delta) - \hat{\beta}_2(M_0, \Delta, X)\right]^2\right\}.$$

8. A method according to claim 6, wherein said $\Delta$ angle parameters $\theta_i$, for $0 \leq i \leq \Delta-1$, are expressed in the following form:

$$\theta_i = f(x_i) = \frac{\pi}{2}(1 - x_i) + \frac{2x_i - 1}{\hat{X}_{M_0,0} + \hat{X}_{M_0,1}\Delta} + 8x_i(2x_i^2 - 3x_i + 1) \times \left[\hat{X}_{M_0,2} + \right.$$

$$\left.\frac{1}{\hat{X}_{M_0,3} + \hat{X}_{M_0,4}\Delta} + 4\left(\hat{X}_{M_0,5} + \frac{1}{\hat{X}_{M_0,6} + \hat{X}_{M_0,7}\Delta}\right)(2x_i - 1)^2\right]$$

where $x_i = \frac{2i+1}{2\Delta}$.

9. A method according to claim 1, wherein said transmission system is of the oversampled OFDM type, implementing an oversampling factor $$\frac{N}{M}$$

such that N>M, with $N=\Delta M_0$, $M=\Delta M_0$, $N_0=M_0+1$, and wherein:
M represents the number of sub-carriers and N the expansion or decimation factor.

10. A method according to claim 1, wherein said transmission system is of the MDFT type with N=2M, and wherein:
M represents the expansion or decimation factor and N the number of sub-carriers.

11. A method according to claim 1, wherein said transmission system is of the WOFDM type, and wherein:
M represents the expansion or decimation factor and N the number of sub-carriers.

12. A device comprising:
a modulator comprising at least one filter of a filter bank configured to modulate symbols for transmission in a transmission or coding system,
at least one non-transitory computer-readable memory storing code instructions,
a processing device, which is configured by the code instructions to determine coefficients p[k] of a prototype filter p for the transmission or coding system, of length L equal to N, from Δ angle parameters $\theta_i$, for integer 0≤i≤Δ−1 and Δ=N/M, expressed on the basis of a polynomial function $f(x)$, also referred to as a compact representation, such that:

$$f(x) = \frac{\pi}{4} + t \sum_{k=0}^{d-1} \beta_k T_{2k}(t)$$

$$t = 2x - 1$$

with:
$T_n(t)$ the Chebyshev polynomial of degree n;
d the degree of the compact representation;
$\beta_k$ the parameters of the compact representation;
$\theta_i = f(x_i)$ with $$x_i = \frac{2i+1}{2\Delta};$$

p[i]=cos $\theta_i$, p[M+i]=sin $\theta_i$, for 0≤i≤Δ−1;
p[k]=1, Δ≤k≤M−1
wherein M and N are integers representative of said transmission or coding system,
said processing device being also configured by the code instructions to determine filter coefficients of the at least one filter of the filter bank using the determined coefficients p[k]; and
said modulator modulates symbols with the at least one filter of the filter bank configured with the determined filter coefficients.

13. A non-transitory computer-readable medium comprising a computer program stored thereon and including instructions for performing a method in a transmission system, when the program is executed by a processor, said method comprising:
determining by the processor coefficients p[k] of a prototype filter p for the transmission system, of length L equal to N, from Δ angle parameters $\theta_i$, for 0≤i≤Δ−1 and integer Δ=N/M, expressed on the basis of a polynomial function $f(x)$, also referred to as a compact representation, such that:

$$f(x) = \frac{\pi}{4} + t \sum_{k=0}^{d-1} \beta_k T_{2k}(t)$$

$$t = 2x - 1$$

with:
$T_n(t)$ the Chebyshev polynomial of degree n;
d the degree of the compact representation;
$\beta_k$ the parameters of the compact representation;
$\theta_i = f(x_i)$ with $$x_i = \frac{2i+1}{2\Delta};$$

p[i]=cos $\theta_i$, p[M+i]=sin $\theta_i$, for 0≤i≤Δ−1;
p[k]=1, Δ≤k≤M−1;
wherein M and N are integers representative of said transmission system,
determining filter coefficients of at least one filter of a filter bank for the transmission system using the determined coefficients p[k], and
implementing the at least one filter of the filter bank using the filter coefficients in the transmission system; and
modulating or demodulating symbols for transmission or reception, respectively, using the at least one filter of the filter bank, which is configured with the filter coefficients.

14. A method of demodulating symbols for reception in a reception system, said method comprising:
performing the following acts with a processing device:
determining coefficients p[k] of a prototype filter p for the reception system, of length L equal to N, from Δ angle parameters $\theta_i$, for 0≤i≤Δ−1 and integer Δ=N/M, expressed on the basis of a polynomial function $f(x)$, also referred to as a compact representation, such that:

$$f(x) = \frac{\pi}{4} + t \sum_{k=0}^{d-1} \beta_k T_{2k}(t)$$

$$t = 2x - 1$$

with:
$T_n(t)$ the Chebyshev polynomial of degree n;
d the degree of the compact representation;
$\beta_k$ the parameters of the compact representation;
$\theta_i = f(x_i)$ with $$x_i = \frac{2i+1}{2\Delta};$$

p[i]=cos $\theta_i$, p[M+i]=sin $\theta_i$, for 0≤i≤Δ−1;
p[k]=1, Δ≤k≤M−1;
wherein M and N are integers representative of said reception system,
determining filter coefficients of at least one filter of a filter bank for the reception system using the determined coefficients p[k];
implementing the at least one filter of the filter bank using the filter coefficients in the reception system; and demodulating symbols for reception using the at least one filter of the filter bank, which is configured with the filter coefficients.

15. A device comprising:
a demodulator comprising at least one filter of a filter bank configured to demodulate symbols for reception in a reception system,
at least one non-transitory computer-readable memory storing code instructions,
a processing device, which is configured by the code instructions to determine coefficients p[k] of a prototype filter p for the reception system, of length L equal to N, from $\Delta$ angle parameters $\theta_i$, for integer $0 \le i \le \Delta-1$ and $\Delta=N/M$, expressed on the basis of a polynomial function $f(x)$, also referred to as a compact representation, such that:

$$f(x) = \frac{\pi}{4} + t \sum_{k=0}^{d-1} \beta_k T_{2k}(t)$$

$$t = 2x - 1$$

with:
$T_n(t)$ the Chebyshev polynomial of degree $\underline{n}$;
$\underline{d}$ the degree of the compact representation;
$\beta_k$ the parameters of the compact representation;
$\theta_i = \theta(x_i)$ with $$x_i = \frac{2i+1}{2\Delta};$$

p[i]=cos $\theta_i$, p[M+i]=sin $\theta_i$, for $0 \le i \le \Delta-1$;
p[k]=1, $\Delta \le k \le M-1$
wherein M and N are integers representative of said reception system,
said processing device being also configured by the code instructions to determine filter coefficients of the at least one filter of the filter bank using the determined coefficients p[k]; and
said demodulator demodulates symbols with the at least one filter of the filter bank configured with the determined filter coefficients.

16. A method of modulating symbols in a sub-band coding system, said method comprising:
performing the following acts with a processing device:
determining coefficients p[k] of a prototype filter p for the sub-band coding system, of length L equal to N, from $\Delta$ angle parameters $\theta_i$, for $0 \le i \le \Delta-1$ and integer $\Delta=N/M$, expressed on the basis of a polynomial function $f(x)$, also referred to as a compact representation, such that:

$$f(x) = \frac{\pi}{4} + t \sum_{k=0}^{d-1} \beta_k T_{2k}(t)$$

$$t = 2x - 1$$

with:
$T_n(t)$ the Chebyshev polynomial of degree $\underline{n}$;
$\underline{d}$ the degree of the compact representation;
$\beta_k$ the parameters of the compact representation;
$\theta_i = f(x_i)$ with $$x_i = \frac{2i+1}{2\Delta};$$

p[i]=cos $\theta_i$, p[M+i]=sin $\theta_i$, for $0 \le i \le \Delta-1$;
p[k]=1, $\Delta \le k \le M-1$;
wherein M and N are integers representative of said sub-band coding system,
determining filter coefficients of at least one filter of a filter bank for the sub-band coding system using the determined coefficients p[k];
implementing the at least one filter of the filter bank using the filter coefficients in the sub-band coding system; and
modulating symbols for transmission using the at least one filter of the filter bank, which is configured with the filter coefficients.

17. A method according to claim 16, wherein said coding system is of the oversampled OFDM implementing an oversampling factor $$\frac{N}{M}$$

such that N>M, with $N=\Delta N_0$, $M=\Delta M_0$, $N_0=M_0+1$, and wherein:
M represents the expansion or decimation factor and N the number of sub-bands.

18. A method according to claim 16, wherein said coding system is of the cosine modulated filter bank type, with N=2M, and wherein:
M represents the expansion or decimation factor and N the number of sub-bands.

19. A method according to claim 16, wherein said coding system is of the cosine modulated filter bank type, and wherein:
M represents the expansion or decimation factor and N the number of subbands.

* * * * *

UNITED STATES PATENT AND TRADEMARK OFFICE
CERTIFICATE OF CORRECTION

PATENT NO. : 9,621,394 B2
APPLICATION NO. : 14/443937
DATED : April 11, 2017
INVENTOR(S) : Pierre Siohan et al.

Page 1 of 1

It is certified that error appears in the above-identified patent and that said Letters Patent is hereby corrected as shown below:

In the Specification

Column 2, Line 43: "if s=0; and" should read -- if S≠0; and --
Column 12, Line 51: "with X, =1.273 and..." should read -- with $X_4$ = 1.273 and .... --
Column 14, Line 36: "$1/\gamma_0(M_0,\Delta) \cong X_{M_0,1} + X_{M_0,1}\Delta$" should read -- $1/\gamma_0(M_0,\Delta) \cong X_{M_0,0} + X_{M_0,1}\Delta$ --
Column 24, Line 23: "maximum localization when $M_0 \leq 3$." should read -- of maximum localization when $M_0 \geq 3$. --
Column 25, Line 15: "For $t$ = 1, the prototype filter $P(z) = z^{-1} \pm z^{-2}$ is obtained, which" should read -- For $t$ = 1, the prototype filter $P(z) = z^{-1} + z^{-2}$ is obtained, which --

In the Claims

Claim 9, Column 32, Line 64: "such that N>M, with N= $\Delta M_0$, ..." should read -- such that N>M, with N= $\Delta N_0$, ... --
Claim 15, Column 35, Line 28: "$\theta_i = \theta(x_i)$ with" should read -- $\theta_i = f(x_i)$ with --

Signed and Sealed this
Nineteenth Day of February, 2019

Andrei Iancu
*Director of the United States Patent and Trademark Office*